US 6,694,066 B2

(12) United States Patent
Xie et al.

(10) Patent No.: US 6,694,066 B2
(45) Date of Patent: Feb. 17, 2004

(54) METHOD AND APPARATUS FOR AN OPTICAL FILTER

(75) Inventors: Ping Xie, San Jose, CA (US); Simon Yuanxinag Wu, San Jose, CA (US); Yalan Mao, Cupertino, CA (US); Wei Wang, San Jose, CA (US); R. Brad Bettman, Mountain View, CA (US); Nadim Maluf, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 84 days.

(21) Appl. No.: 09/879,026

(22) Filed: Jun. 11, 2001

(65) Prior Publication Data

US 2002/0154845 A1 Oct. 24, 2002

Related U.S. Application Data

(60) Provisional application No. 60/269,190, filed on Feb. 14, 2001.

(51) Int. Cl.⁷ .............................................. G02B 6/00
(52) U.S. Cl. ........................................................ 385/11
(58) Field of Search ............................. 385/11, 3, 36; 359/117, 124, 127

(56) References Cited

U.S. PATENT DOCUMENTS

| 4,094,581 A | | 6/1978 | Baldwin .................... 349/249 |
| 4,685,773 A | | 8/1987 | Carlsen et al. ............. 359/495 |
| 4,813,761 A | | 3/1989 | Davis et al. ................ 349/201 |
| 4,987,567 A | | 1/1991 | Buhrer ....................... 359/127 |
| 5,319,483 A | * | 6/1994 | Krasinski et al. ........... 359/113 |
| 5,596,661 A | | 1/1997 | Henry et al. .................. 385/24 |
| 5,606,439 A | | 2/1997 | Wu ............................ 349/117 |
| 5,694,205 A | | 12/1997 | Gualtieri et al. ............. 356/33 |
| 5,694,233 A | | 12/1997 | Wu et al. ..................... 359/117 |
| 5,710,845 A | * | 1/1998 | Tajima ......................... 385/16 |
| 5,867,291 A | | 2/1999 | Wu et al. .................... 359/124 |
| 5,894,532 A | * | 4/1999 | Moores ........................ 385/11 |
| 6,005,697 A | | 12/1999 | Wu et al. .................... 359/117 |
| 6,208,444 B1 | | 3/2001 | Wong et al. ................. 359/127 |

* cited by examiner

Primary Examiner—Tulsidas Patel
(74) Attorney, Agent, or Firm—Workman Nydegger

(57) ABSTRACT

The present invention provides optical filters that can be used in a range of telecommunications applications including optical multiplexers/demultiplexers, optical routers, and optical gain scalers. The optical filter is modular, using two or more couplers with a pair of delay paths between each pair of couplers in a sequence to generate a range of optical filter functions. The desired filter profile/function is obtained by proper selection of the coupling ratio for each coupler and by the length of each pair of delay paths. The couplers may be implemented as polarization or intensity beam splitters positioned along the optical path. Each coupler couples in controllable amounts, one or two inputs with the corresponding pair of delay paths. Where a coupler is implemented as a polarization beam splitter, the coupling is accomplished by input to the coupler of polarized light and by the subsequent separation of orthogonal "P" and "S" components of that light onto corresponding ones of the pair of delay paths. Where coupling is implemented with an intensity beam splitter, the coupling is accomplished by input of light with the percentage of reflection and transmission of the light determining the coupling ratio or percentage of the light input onto corresponding ones of the pair of delay paths. The pair of delay paths includes in an embodiment of the invention, passive thermal stabilization. The passive thermal stabilization of the filter(s) is accomplished by a plurality of optical elements positioned in and defining the optical path length of each member of the pair of paths. These optical elements are designed so that the optical path length difference between the pair of delay paths remains substantially invariant across a range of temperatures.

49 Claims, 12 Drawing Sheets

POLARIZATION MODE

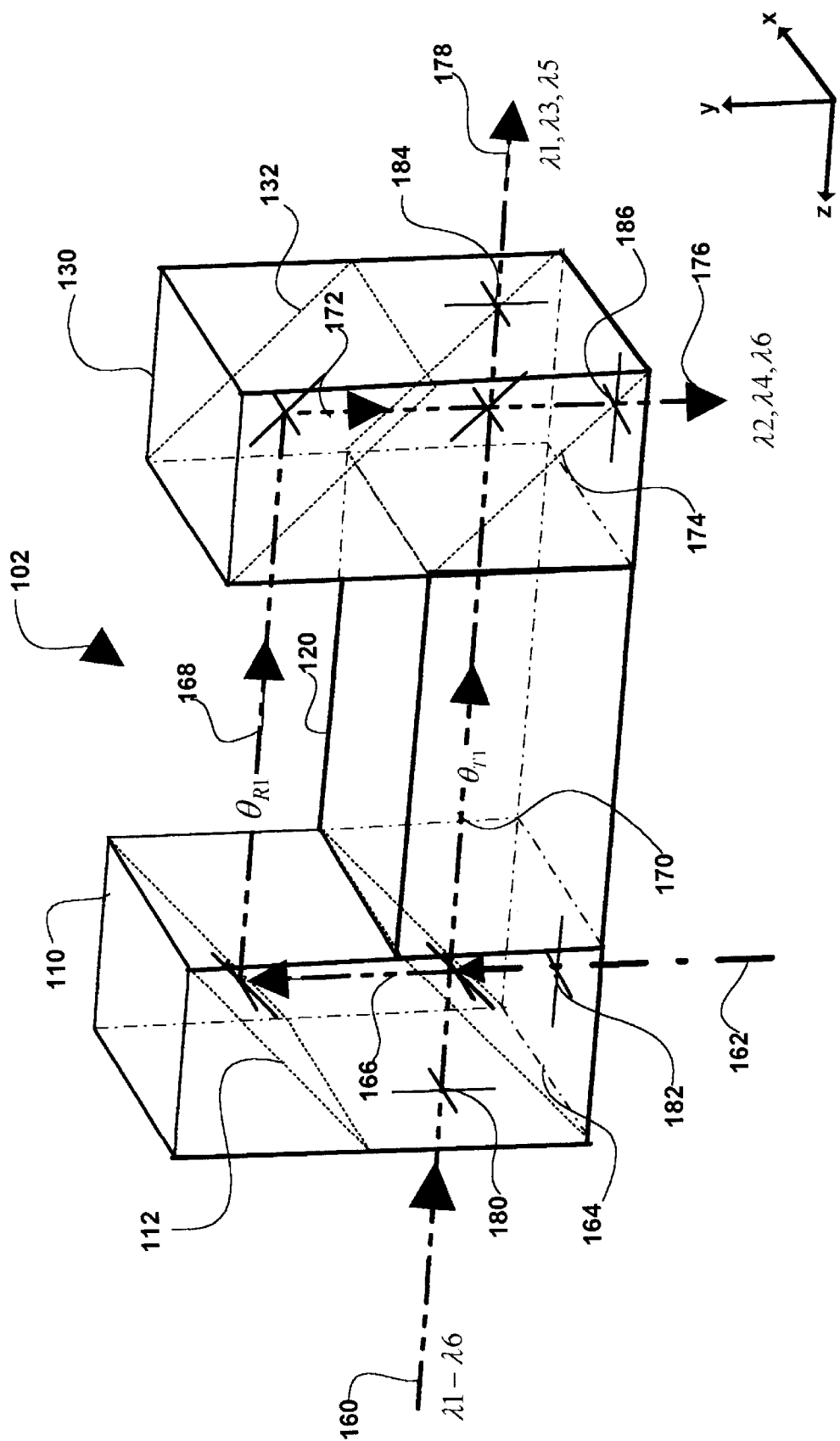
FIG. 1B  INTENSITY MODE

POLARIZATION MODE

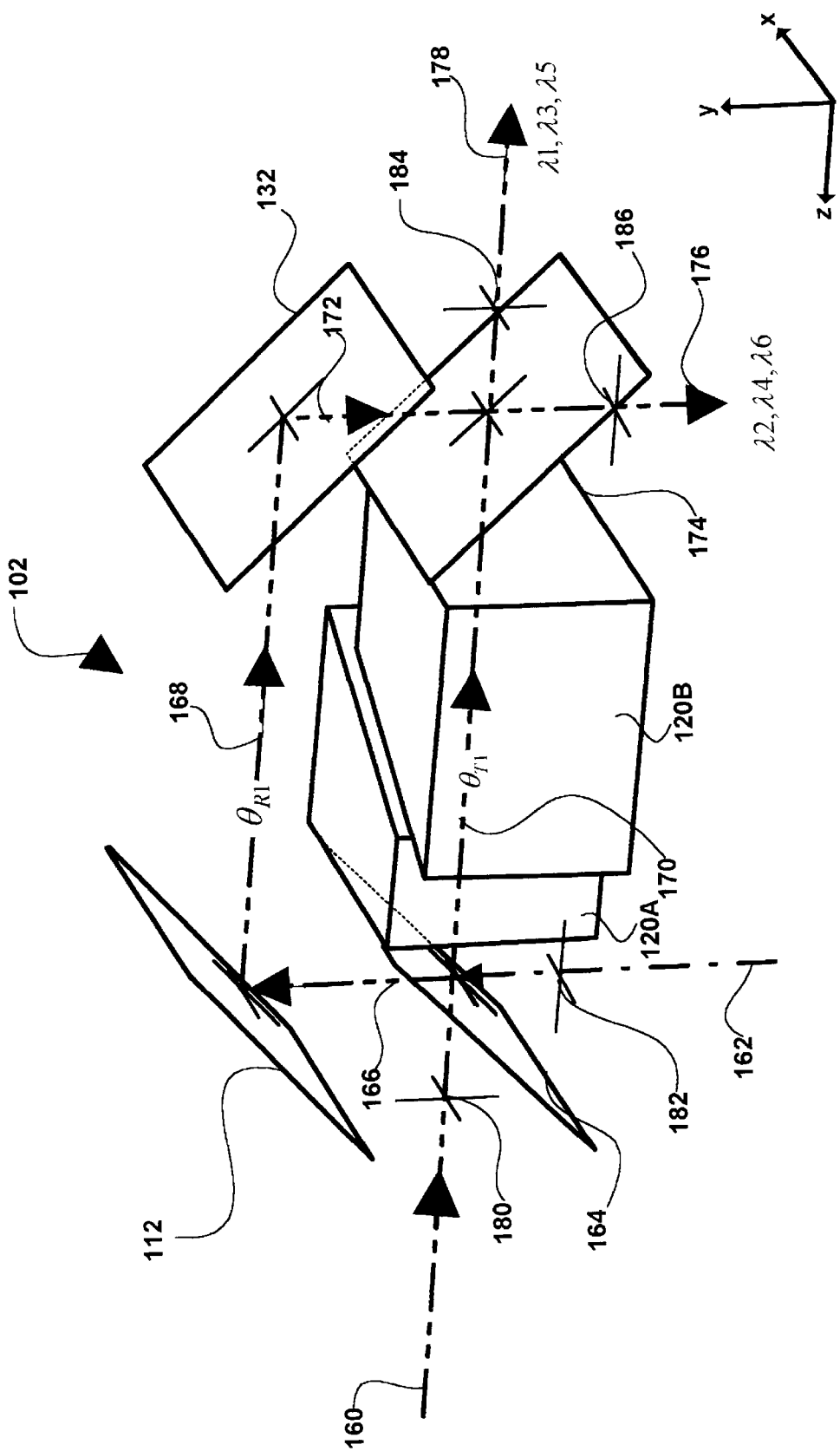
FIG. 1E  INTENSITY MODE

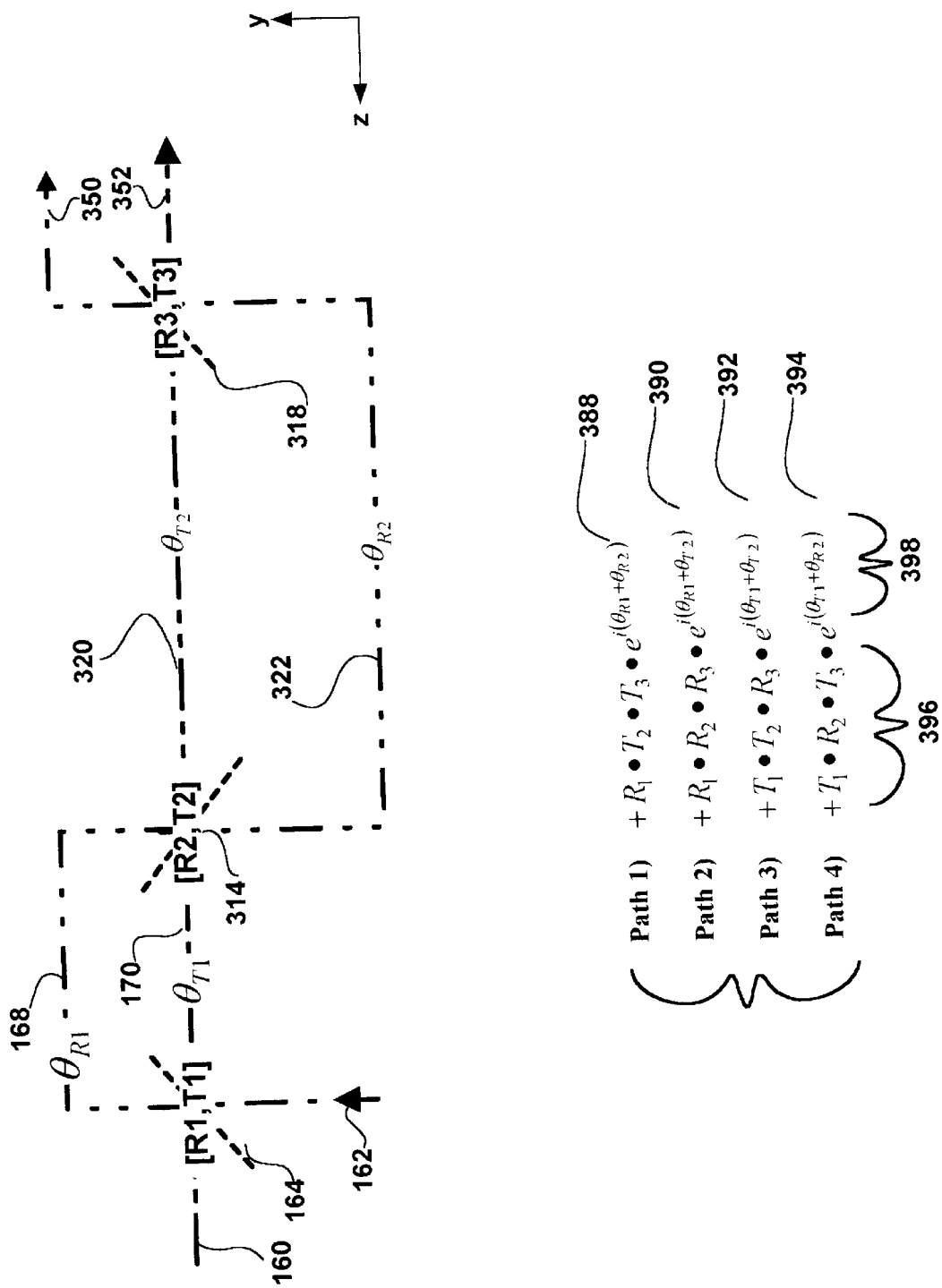

METHOD AND APPARATUS FOR AN OPTICAL FILTER

CROSS-REFERENCE TO RELATED APPLICATION

This application Claims priority from Provisional Application No. 60/269,190 entitled "ATHERMALIZED POLARIZATION INTERFEROMETER" filed on Feb. 14, 2001 which is incorporated herein by reference in its entirety.

BACKGROUND OF THE INVENTION

1. Field of Invention

The present invention generally relates to optical filters and more particularly to optical filters for optical fiber communication networks.

2. Description of the Related Art

The Synchronous Optical Network (SONET) standard defines a hierarchy of multiplexing levels and standard protocols which allow efficient use of the wide bandwidth of fiber optic cable, while providing a means to merge lower level DS0 and DS1 signals into a common medium. Currently optical communication is accomplished by what is known as "wavelength division multiplexing" (WDM), in which separate subscriber/data sessions may be handled concurrently on a single optic fiber by means of modulation of each of those subscriber data streams on different portions, a.k.a. channels, of the light spectrum.

The spacing between channels is constantly being reduced as the resolution and signal separation capabilities of multiplexers and de-multiplexers are improved. Current International Telecommunications Union (ITU) specifications call for channel separations of approximately 0.4 nm, i.e., 50 GigaHertz (GHz). At this channel separation as many as 128 channels may be supported in C-band alone. Each channel is modulated on a specific center frequency, within the range of 1525–1575 nm, with the center frequency of each channel provided by a corresponding one of 128 semiconductor lasers. The modulated information from each of the semiconductor lasers is combined (multiplexed) onto a single optic fiber for transmission. As the length of a fiber increases the signal strength decreases. To offset signal attenuation erbium doped fiber amplifiers (EDFAs) are used at selected locations along the communication path to boost signal strength for all the channels. At the receiving end the processes is reversed, with all the channels on a single fiber separated (demultiplexed), and demodulated optically and/or electrically.

Optical filters play important roles in handling these optical communications for the telecommunications industry. They perform wavelength multiplexing and demultiplexing of the 128 or more optical channels. They may also be used to gain scale EDFAs by flattening their gain profile.

The requirements for optical filters used for any of these applications are very demanding. The close spacing between the channels in a WDM, makes it desirable to design a WDM with flat pass bands in order to increase the error tolerance. This is primarily because the center wavelength of a transmitter slips with temperature. Further, the cascading of the WDM stages causes the pass bands to become narrower at each WDM down the chain. Therefore, the larger the pass bands the greater the shift tolerance of the channel.

Various devices, such as multi-stage band and comb splitters, have been proposed to fill these new demanding requirements and none are fully satisfactory. In a multi-stage band splitter, the first stage makes a coarse split of two wavelength ranges, and subsequent stages make finer and finer splits of sub-bands within each of the wavelength ranges. In a multi-stage comb splitter, the first de-multiplexing stage filters out two interlaced periodic sets of relatively narrow band passes and the subsequent stages employ wider band pass periodic filters until the individual channels are de-multiplexed. In either case, noise and inter-channel interference are limiting factors in the handling of increasingly narrow band pass requirements. Multi-layer thin-film filters can be used to construct optical filters in bulk optics, but they are undesirable because of an increase in the number of layers, precision of manufacture and expense associated with increasingly narrow band pass requirements. Mach-Zehnder interferometers have been widely employed, but they have a sinusoidal response, giving rise to strongly wavelength dependent transmission and a narrow rejection band. Other designs have encountered a variety of practical problems.

Accordingly, there is a need for the new type of optical filters for optical multiplexing/demultiplexing and other optical applications.

SUMMARY OF THE INVENTION

The present invention provides optical filters that can be used in a range of telecommunications applications including optical multiplexers/demultiplexers, optical routers, and optical gain scalers. The optical filter is modular, using two or more couplers with a pair of delay paths between each pair of couplers in a sequence to generate a range of optical filter functions. The desired filter profile/function is obtained by proper selection of the coupling ratio for each coupler and by the length of each pair of delay paths. The optical filter is very easily fabricated, relying on micro-optic components. The couplers may be implemented as polarization or intensity beam splitters positioned along the optical path.

Each coupler couples in controllable amounts, one or two inputs with the corresponding pair of delay paths. Where a coupler is implemented as a polarization beam splitter, the coupling is accomplished by input to the coupler of polarized light and by the subsequent separation of orthogonal "P" and "S" components of that light onto corresponding ones of the pair of delay paths. The coupling ratio or percentage is determined, in the case of a polarization beam splitter by the rotation of the polarization beam splitter with respect to the linearly polarized input. Where the coupler is implemented as an intensity beam splitter, the coupling is accomplished by input of light with the percentage of reflection and transmission of the light determining the coupling ratio or percentage of the light input onto corresponding ones of the pair of delay paths. The pair of delay paths may include passive thermal stabilization to allow the filter to function across a range of temperatures without substantial variation in its filter profile. The passive thermal stabilization of the filter(s) may be accomplished by a plurality of optical elements positioned in and defining the path length of each member of the pair of paths. These optical elements are designed so that the optical path length difference between the pair of delay paths remains substantially invariant across a range of temperatures.

BRIEF DESCRIPTION OF THE DRAWINGS

These and other features and advantages of the present invention will become more apparent to those skilled in the art from the following detailed description in conjunction with the appended drawings in which:

FIG. 1B is an isometric view of an optical filter cell with couplers employing intensity dependent beam splitting linked by a pair of delay paths.

FIG. 3C is a side elevation view of the variable coupling between cells of the multi-cell implementation shown in FIG. 3A.

FIG. 3D shows the individual transforms associated with each of the optical paths shown in FIG. 3A.

DETAILED DESCRIPTION OF THE EMBODIMENTS

Figure 1A:
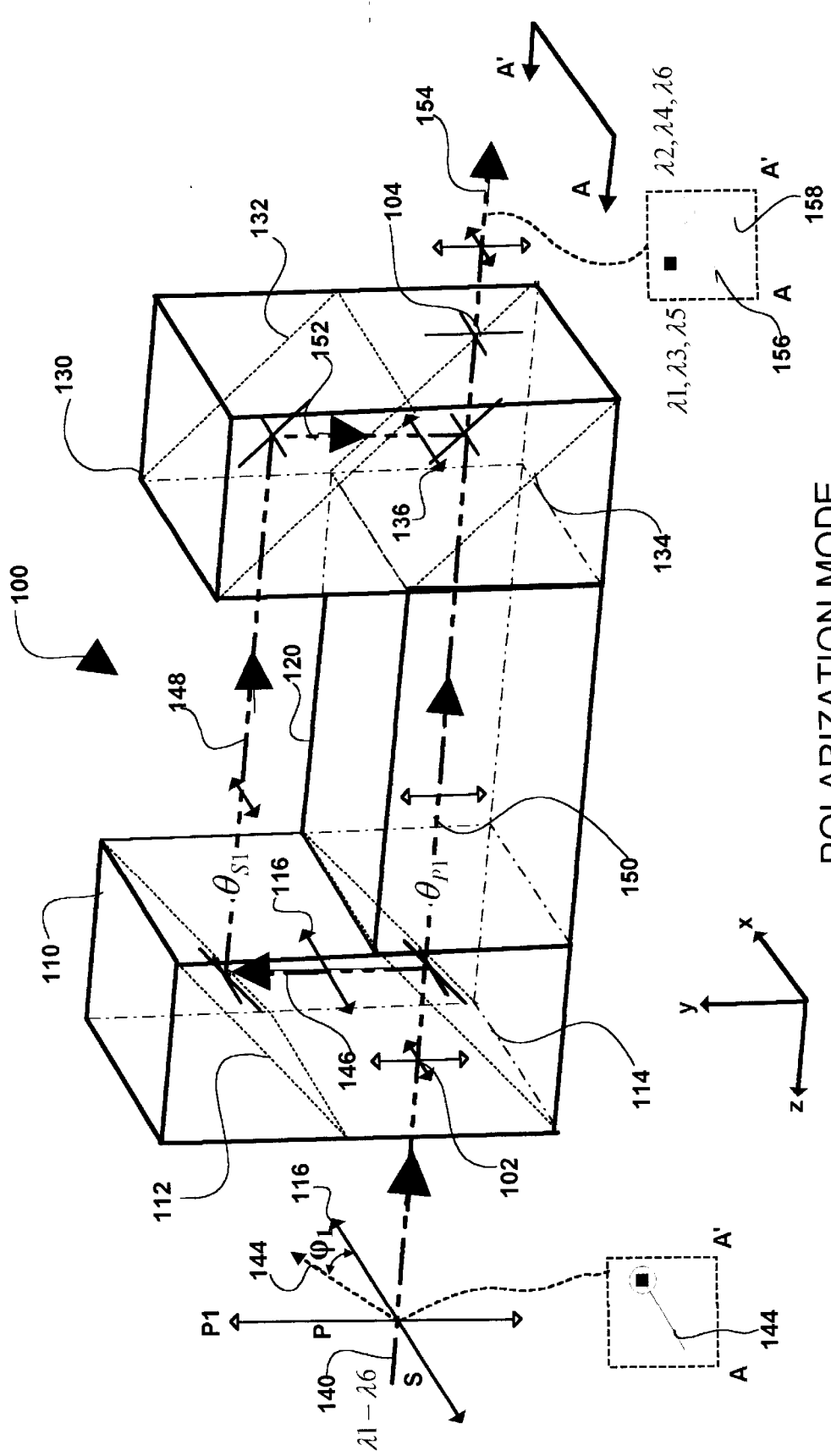
FIG. 1A is an isometric view of an optical filter cell with couplers employing polarization dependent beam splitting linked by a pair of delay paths.

FIG. 1A is an isometric view of an optical filter cell 100 with couplers employing polarization dependent beam splitting linked by a pair of delay paths 150 and 146,148,152. Each coupler transmits and reflects light depending on the input properties of the light. In the embodiment of the invention shown in FIG. 1A, each coupler is polarization sensitive and includes "P" and "S" polarization axis orthogonal to one another. A first coupler is positioned in the propagation path of incoming polarized light and transmits and reflects components of incoming polarized light aligned with the "P" and "S" polarization axis of the coupler respectively. Light transmitted and reflected by the coupler follows two distinct delay paths, one for transmitted light and the other for reflected light. Where incoming light is orthogonally polarized, the first coupler provides configurable amounts of coupling and cross-coupling of each of the orthogonal polarization vectors of the incoming light with either of the pair of delay paths. A second coupler positioned at a location where the two distinct delay paths intersect reverses the process and re-aligns light with orthogonal polarization vectors onto a common propagation axis.

The cell is shown within an "x,y,z" Cartesian coordinate system. The cell includes opposing optical glass blocks 110, 130 displaced from one another along the z axis with the optical element 120 covering the span between the blocks. Optical glass block 110 is shown with a reflector 112 and a polarization dependent beam splitter 114 displaced from each other in a direction defined by the y axis. Optical glass block 130 is shown with a reflector 132 and a polarization dependent beam splitter 134 displaced from each other in a direction defined by the y axis. The polarization dependent beam splitters have "S" polarization axes 116 and 136 respectively which are aligned with one another and in the orientation of the cell that is shown, also aligned with the x axis. The "P" polarization axis of each polarization dependent beam splitter are orthogonal to the "S" axis. Polarized light input at the first port 102 will couple with both the P and S axis of the first coupler 114, a polarization beam splitter in amounts which corresponded with the relative angular rotation between the polarization vector(s) of the polarized input and the orthogonal P and S polarization axis of the beam splitter. The component of a polarized input which projects onto the S polarization axis of the beam splitter will be reflected by the beam splitter. The component of a polarized input which projects onto the P polarization axis of the beam splitter will be transmitted by the beam splitter. Between the couplers an optical element 120 is shown.

Each optical glass block 110,130 may in fact be fabricated from two pairs of prisms. In the case of block 110 the polarization dependent beam splitter 114 may be formed from a first pair of prisms at right or other complementary angles to one another, which are cemented together to minimize wave front distortion. The hypotenuse of one of the prisms is coated with a multi layer dielectric polarizing beam splitter coating. The prisms are then cemented together, to form a first rectangle, the exterior surfaces of which may be antireflection coated (AR) to minimize surface reflection losses. A second pair of prisms may be used to form the reflector 112. The hypotenuse of one of this second pair of prisms is coated with a reflective dielectric coating, and cemented to the hypotenuse of the other of the second pair of prisms. The hypotenuses of this second pair of prisms are then cemented together as well to form a second rectangle, the exterior surfaces of which may also be AR coated. The two rectangles formed by the two pairs of prisms may then be cemented to one another to form the glass block 110. A similar technique may be used to fabricate the second block 130.

The cell 100 couples light bi-directionally between a first port 102 and a second port 104 displaced from one another in a direction defined by the z axis. For purposes of illustration, polarized light 140 is shown entering the cell at the first port and exiting as a polarized output beam 154 at the second port though the propagation in the opposite direction is also supported. The cell is also highly directional so that light propagating in one direction is independent of the light propagating in the reverse direction. The polarized light beam 140 may be arbitrarily, circularly or linearly polarized. In the example shown, beam 140 is linearly polarized with a polarization vector 144 at an angle $\phi_1$ with respect to the "S" polarization axis 116 of the cell. As the beam 140 enters the cell it is accepted onto either of two distinct P and S delay paths 150 and 146,148,152 respectively. These delay paths link the polarization dependent beam splitters 114, 134. The amount of light that is coupled onto either delay path is determined by the angle $\phi_1$ of the incoming beam vector with respect to the S polarization axis of the cell. In the example shown, light from polarization vector 144 in amounts proportionate to sine($\phi_1$) and cos($\phi_1$) will couple to the P and S delay paths respectively. Rotation of the cell about the propagation path, e.g. the z axis, of the beam 140 can be used to vary the coupling percentages or ratios between the incoming light and the P and S delay paths. Where incoming light includes orthogonal polarization vectors the coupling of either vector will be determined by projecting that vector onto the P and S polarization axis of the polarization beam splitter as well. The polarization beam splitters 114,134 thus serve as couplers which provide configurable amounts of coupling and cross-coupling of incoming beams with either of the pair of delay paths.

The amount of delay on the P and S delay paths are $\theta_{P1}$ and $\theta_{S1}$ respectively. The delay of each path is determined by its corresponding optical path length. The optical path length of each path is the sum of the product of physical dimension and the index of refraction of all the optical elements on each of the two distinct P and S delay paths 150 and 146,148,152 respectively. The delay difference for the cell is proportional to the difference in the optical path lengths between the P and S delay paths. The delay difference exhibits itself in the optical properties of the output beam 154. That output beam exhibits the interference pattern produced by the re-coupling of the P and S delay paths by the second of the polarization beam splitters 134 into a single output beam. The output beam includes orthogonal polarization vectors 156–158. Each contains complementary periodic stop bands and pass bands of the other with center wavelengths the spacing between which is inversely related to the delay difference between the P and S delay paths. In other words the larger the delay difference the smaller the wavelength spacing which the optical filter cell can resolve. The first vector 156 contains pass bands with center wavelengths at even integer multiples of the periodic interval established by the delay difference. The second vector 158 contains pass bands with center wavelengths at odd integer multiples of the periodic interval established by the delay difference.

The cell 100 may be provided with an appropriate lens, e.g. a Gradient Index of Refraction Lens (GRIN) and a linear polarizer coupled to the first port to linearly polarize arbitrarily polarized incoming light and to direct it to the first port. At the opposite end, a beam displacer/combiner may be coupled with the second port to displace and combine orthogonally polarized odd and even channel components 156–158 of an optical beam depending on the propagation direction of the light beam An appropriate lens(es), e.g. (GRIN) may also be added at this end to focus and collimate the light from the beam displacer/combiner depending on the propagation direction. The resultant system may serve as either or both a multiplexer or a demultiplexer depending on a propagation direction of the light.

In an alternate embodiment of the invention there by be a single reflector replacing reflectors 112 and 130 132 to bend the S delay path between the two popularization beam splitters 114 and 134. In still another embodiment additional reflectors may be added.

In an alternate embodiment of the invention an opposing pair of back-to-back birefringent crystals may be used instead of the polarization beam splitters to split incoming light into an "e" and an "o" ray delay path corresponding with "S" and "P" delay paths respectively. The principal planes of the pair of crystals would be aligned in a common plane with the optical axis of each birefringent crystal at substantially complementary angles to one another so as to cause a splitting and recombining of the e and o ray delay paths.

FIG. 1B is an isometric view of an optical filter cell 102 with couplers employing intensity dependent beam splitting linked by a pair of delay paths 170 and 166,168,172. This cell is also shown within an "x,y,z" Cartesian coordinate system The cell includes many of the features of the cell shown in FIG. 1A with the exception that the coupling function is here performed by partial reflectors 164,174 which form intensity beam splitters. The cell includes opposing optical glass blocks 110, 130 displaced from one another along the z axis with the optical element 120 covering the span between the blocks. Optical glass block 110 is shown with a reflector 112 and the intensity beam splitter 164 displaced from each other in a direction defined by the y axis. Optical glass block 130 is shown with a reflector 132 and an intensity beam splitter 174 displaced from each other in a direction defined by the y axis. Between the couplers an optical element 120 is shown.

Each optical glass block may in fact be fabricated from two pairs of prisms. In the case of block 110 the intensity beam splitter 164 may be formed from a first pair of prisms at right or other complementary angles to one another, which are cemented together to minimize wave front distortion. The hypotenuse of one of the prisms is coated with a multi layer dielectric beam splitter coating which exhibits configurable amounts of transmission and reflection of an incident beam. The prisms are then cemented together, to form a first rectangle, the exterior surfaces of which may be antireflection coated (AR) to minimize surface reflection losses. A second pair of prisms may be used to form the reflector 112. The hypotenuse of one of this second pair of prisms is coated with a reflective dielectric coating, and cemented to the hypotenuse of the other of the second pair of prisms. The hypotenuses of this second pair of prisms are then cemented together as well to form a second rectangle, the exterior surfaces of which may also be AR coated. The two rectangles formed by the two pairs of prisms may then be cemented to one another to form the glass block 110. A similar technique may be used to fabricate the second block 130.

The cell 102 couples light bi-directionally between first/second ports 180–182 and the third/fourth ports 184–186. For purposes of illustration optical beams 160–162 are shown entering the cell at the first and second ports 180–182 respectively and exiting the cell as beams 178–176 at the third and fourth ports 184–186 respectively. Propagation in the opposite direction is also supported. The cell is also highly directional so that light propagating in one direction is independent of the light propagating in the reverse direction. In the example shown, beam 160 enters the cell at port 180 and beam 162 enters the cell at port 182. Each beam is accepted onto either of two distinct transmission ($T_1$) and reflection ($R_1$) delay paths 170 and 166, 168, 172 respectively. These delay paths link the intensity beam splitters 164,174. The amount of light that is coupled from the inputs at ports 180 and 182 onto either delay path by each beam is determined by the beam path and the ratio or percentage of transmission and reflection of the beam splitter 164. The amount of light that is coupled from the either delay path to the output at ports 184 and 186 is determined by the beam path and the ratio or percentage of transmission and reflection of the beam splitter 174. The percentage of transmission and reflection is an optical property that can be precisely specified. The intensity beam splitters 164,174 thus serve as couplers which provide configurable amounts of coupling and cross-coupling of incoming beams with either of the pair of delay paths.

The amount of delay on the $T_1$ and $R_1$ delay paths 170 and 166, 168, 172 are $\theta_{T1}$ and $\theta_{R1}$ respectively. The delay of each path is determined by its corresponding optical path length. The optical path length of each path is the sum of product of the physical dimension and the index of refraction of all the optical elements on each of the two distinct delay paths. The delay difference for the cell is proportional to the difference in the optical path lengths between the $R_1$ and $T_1$ delay paths. The delay difference exhibits itself in the optical properties of the output beams 176–178. The output beams exhibit an interference pattern produced by the re-coupling of the $R_1$ and $T_1$ delay paths by the second of the beam splitters 174. Each output beam contains complementary periodic stop bands and pass bands of the other with center wavelengths the spacing between which is inversely related to the delay difference between the $R_1$ and $T_1$ delay paths. In other words the larger the delay difference the smaller the wavelength spacing which the optical filter cell can resolve. Output beam 176 contains pass bands with center wavelengths at even integer multiples of the periodic interval established by the delay difference. Output beam 178 contains pass bands with center wavelengths at odd integer multiples of the periodic interval established by the delay difference.

The single cell 102 may serve as either or both a multiplexer or a demultiplexer depending on a propagation direction of the light.

For each of the optical filters discussed above it may be necessary to adjust the center wavelength of any given cell or set of delay paths. This can be accomplished by tilting of the cell about the x axis normal to the propagation path, or by tilting each of the component within the cell resulting a net change of effective optical path length difference. This will allow a shifting of the center wavelength of all the pass bands generated by each cell or delay path.

Figure 1C:
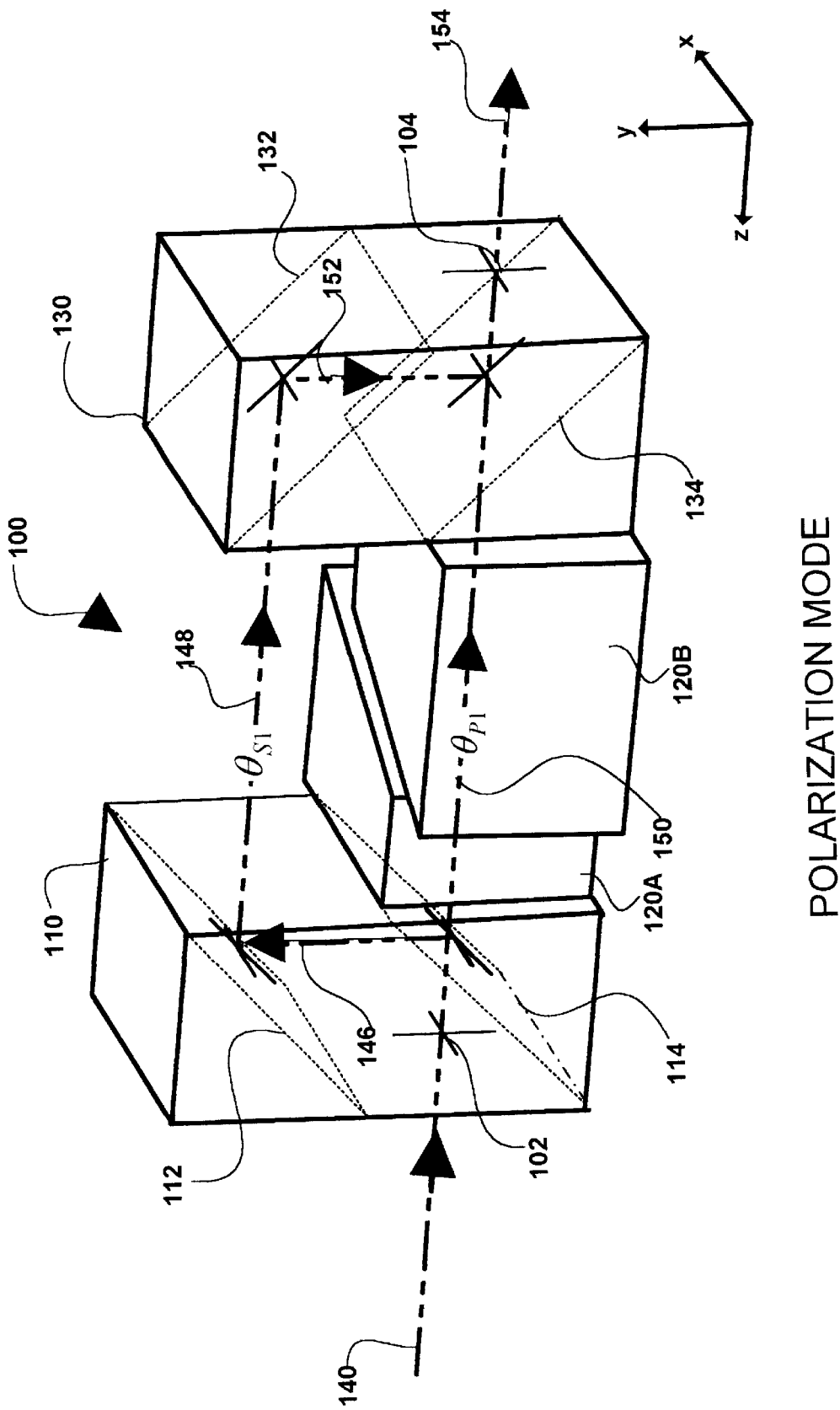
FIG. 1C is an isometric view of an optical filter cell shown in FIG. 1A with one of the optical elements configured for adjustment of the center wavelength of the filter.

FIG. 1C is an isometric view of an optical filter cell shown in FIG. 1A with one of the optical elements, i.e. element 120, configured for adjustment of the center wavelength of the filter. Optical element 120 is shown cleaved into a pair of complementary wedges 120A and 120B. As each wedge is moved in opposing directions along the x axis the optical path length of delay path 150 is altered. This results in a shift in the center wavelength of the cell. Once the cell exhibits the desired center wavelength the wedges 120A, 120B are fixed relative to the blocks 120 and 130.

Figures 1D, 1E:
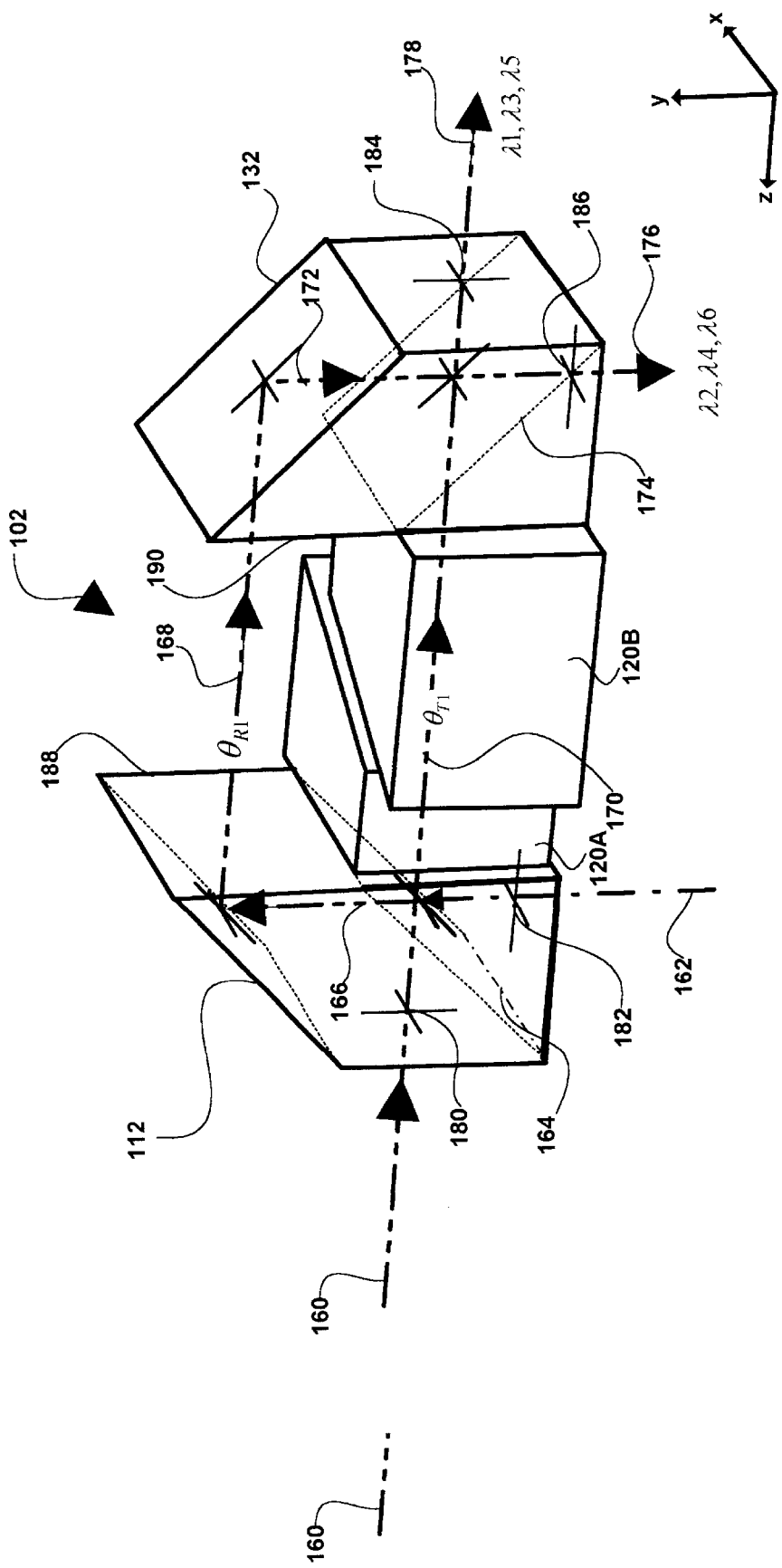
FIG. 1D is an isometric view of an optical filter cell shown in FIG. 1B with one of the optical elements configured for adjustment of the center wavelength of the filter and with an alternate coupler configuration.
FIG. 1E is an isometric view of an optical filter cell shown in FIG. 1B with one of the optical elements configured for adjustment of the center wavelength of the filter and with an alternate coupler configuration.

FIG. 1D is an isometric view of an optical filter cell shown in FIG. 1B with one of the optical elements configured for adjustment of the center wavelength of the filter and with an alternate coupler configuration. As discussed above in connection with FIG. 1C the cleaving of element 120 into wedges 120A and 120B provides a means for shifting the center wavelength of the cell.

FIG. 1D also introduces an alternate configuration for the blocks 110 and 130 shown in FIGS. 1A–B. This alternate block configuration is shown in the context of intensity dependent beam splitting as introduced in FIG. 1B, and may be applied with equal advantage to the polarization dependent beam splitting shown in FIG. 1A. The couplers 164,174 are defined on the corresponding external base faces of a pair of opposing blocks 188 and 190. Each block 188,190 is configured with an upper angular portion on the corresponding external surfaces of which the reflectors 112,132 respectively are defined.

FIG. 1E is an isometric view of an optical filter cell shown in FIG. 1B with one of the optical elements configured for adjustment of the center wavelength of the filter and with an alternate coupler configuration. As discussed above in connection with FIG. 1C the cleaving of element 120 into wedges 120A and 120B provides a means for shifting the center wavelength of the cell.

FIG. 1E also introduces still another configuration for the blocks 110 and 130 shown in FIGS. 1A–B. This alternate block configuration is also shown in the context of intensity dependent beam splitting as introduced in FIG. 1B, and may be applied with equal advantage to the polarization dependent beam splitting shown in FIG. 1A. In this embodiment of the invention the block structure is dispensed with and each coupler 164,174 is defined on its own discrete substrate. Suitable substrates include any suitable transparent medium, e.g. optical glass or a semi-conductor. Similarly, reflectors 112 and 132 are realized on their own discrete substrate, which in this case does not need to be transparent. Each coupler and reflector is positioned with respect to one another by a suitably stable frame, not shown.

Figures 2A, 2B:
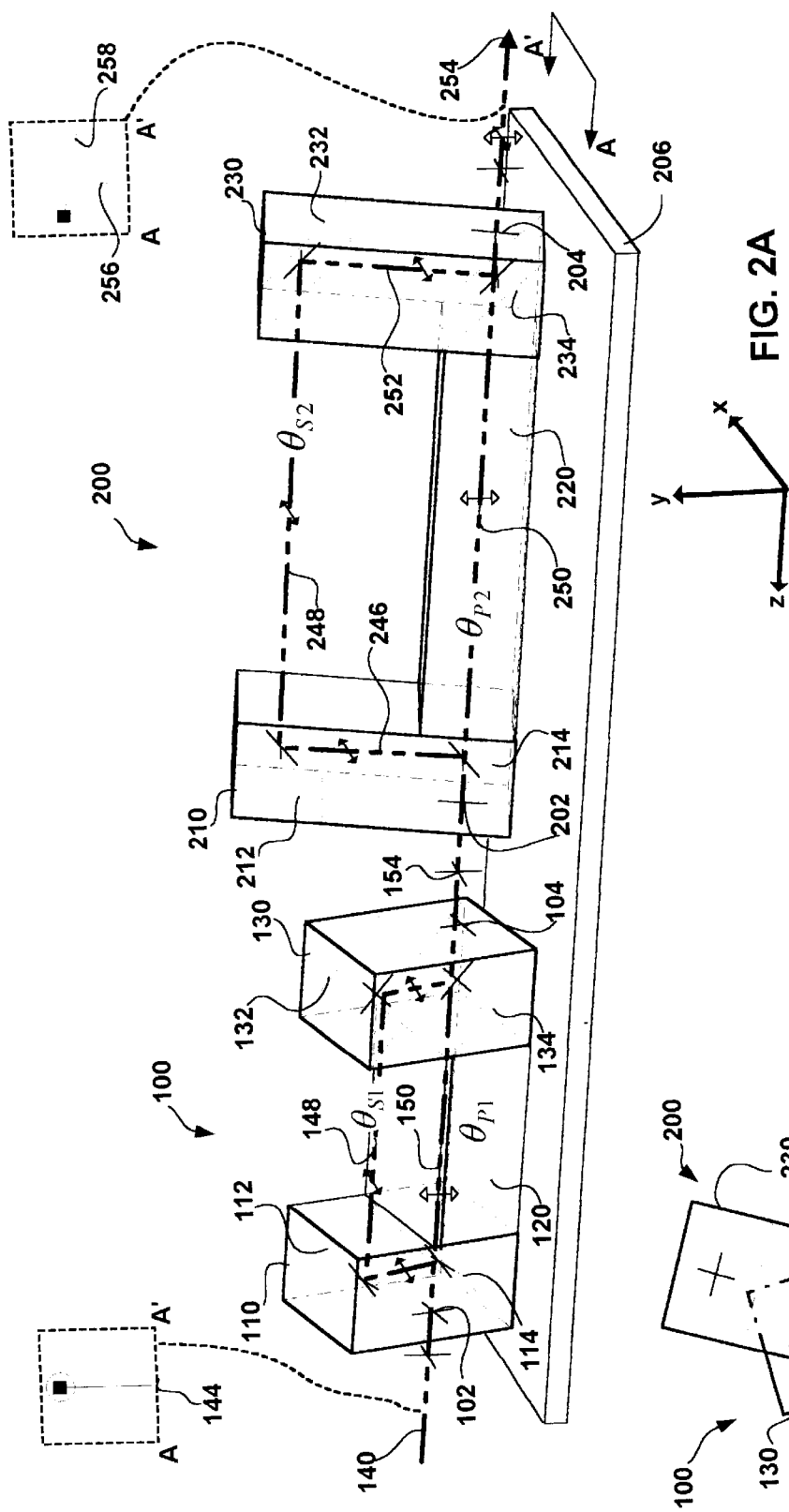
FIGS. 2A–B are isometric and end views respectively of a multi-cell implementation of the optical filter cell shown in FIG. 1A.

FIGS. 2A–B are isometric and end views respectively of a multi-cell implementation of the optical filter cell shown in FIG. 1A. Two cells 100 and 200 are shown coupled serially to one another in sequence. This concept of serially coupling cells allows an optical filter to exhibit a more complex transfer function than the simple sinusoidal output provided by the single cell shown in FIG. 1A. In this example the delay paths provided by cell 200 and their delay difference are larger than the delay paths and delay difference provided by the cell 100. This result can be achieved either by fabricating cell 200 from the same optical elements as cell 100 with an increase in the physical length of the elements or by fabricating cell 200 from optical elements with higher indices of refraction than those of cell 100 thus maintaining the same form factor for both cells.

The combination of first cell and subsequent cells can be looked at as establishing by the difference between their delay paths the fundamental sinusoidal harmonic for the sequence and higher order harmonics. In an embodiment of the invention this objective is achieved by designing one of the cells in the sequence with a FSR corresponding with the desired fundamental harmonic and with others of the cells designed with FSRs which are integer fractions of the base FSR. The coefficients or amplitude of each harmonic are provided by varying the coupling ratio/percentage/coefficients between a polarized input to a cell and the P and S polarization axes of the cell as provided by the corresponding polarization beam splitter. The coupling coefficients are varied by tilting of a cell about the propagation path of a polarized input to each cell.

Cell 100 includes the components described above in connection with FIG. 1A. Cell 200 includes couplers 214, 234 employing polarization dependent beam splitting linked by a pair of delay paths 250 and 246, 248, 252. The cell 200 includes opposing optical glass blocks 210, 230 displaced from one another along the z axis with the optical element 220 covering the span between the blocks. Optical glass block 210 is shown with a reflector 212 and a polarization dependent beam splitter 214 displaced from each other in a direction defined by the y axis. Optical glass block 230 is shown with a reflector 232 and a polarization dependent beam splitter 234 displaced from each other in a direction defined by the y axis. The polarization dependent beam splitters have "S" polarization axis which are aligned with one another. Between the couplers an optical element 220 is shown. The various components are shown on top of base 206.

Polarized beam 140 has, in the example shown, a linearly polarized input with a vector 144. This beam enters the cell 100 at the first port 102, is reflected and transmitted by polarization beam splitter 114 onto one end of the pair of delay paths $\theta_{S1}$ and $\theta_{P1}$. At the opposite end of the delay paths reflection and transmission by the polarization beam splitter 134 produces a common output beam 154 which exits the cell 100 at port 104. Port 104 of the first cell couples with port 202 of the next cell 200 in the sequence. Thus, the beam 154 output from the first cell enters the second cell 200 where it is reflected and transmitted by polarization beam splitter 214 onto one end of the pair of delay paths $\theta_{S2}$ and $\theta_{P2}$. At the opposite end of the delay paths reflection and transmission by the polarization beam splitter 234 produces a common output beam 254 which exits the cell 200 at port 204. The process can be repeated to form a longer sequence of cells and a more complex optical filter transfer function.

Figure 2C:
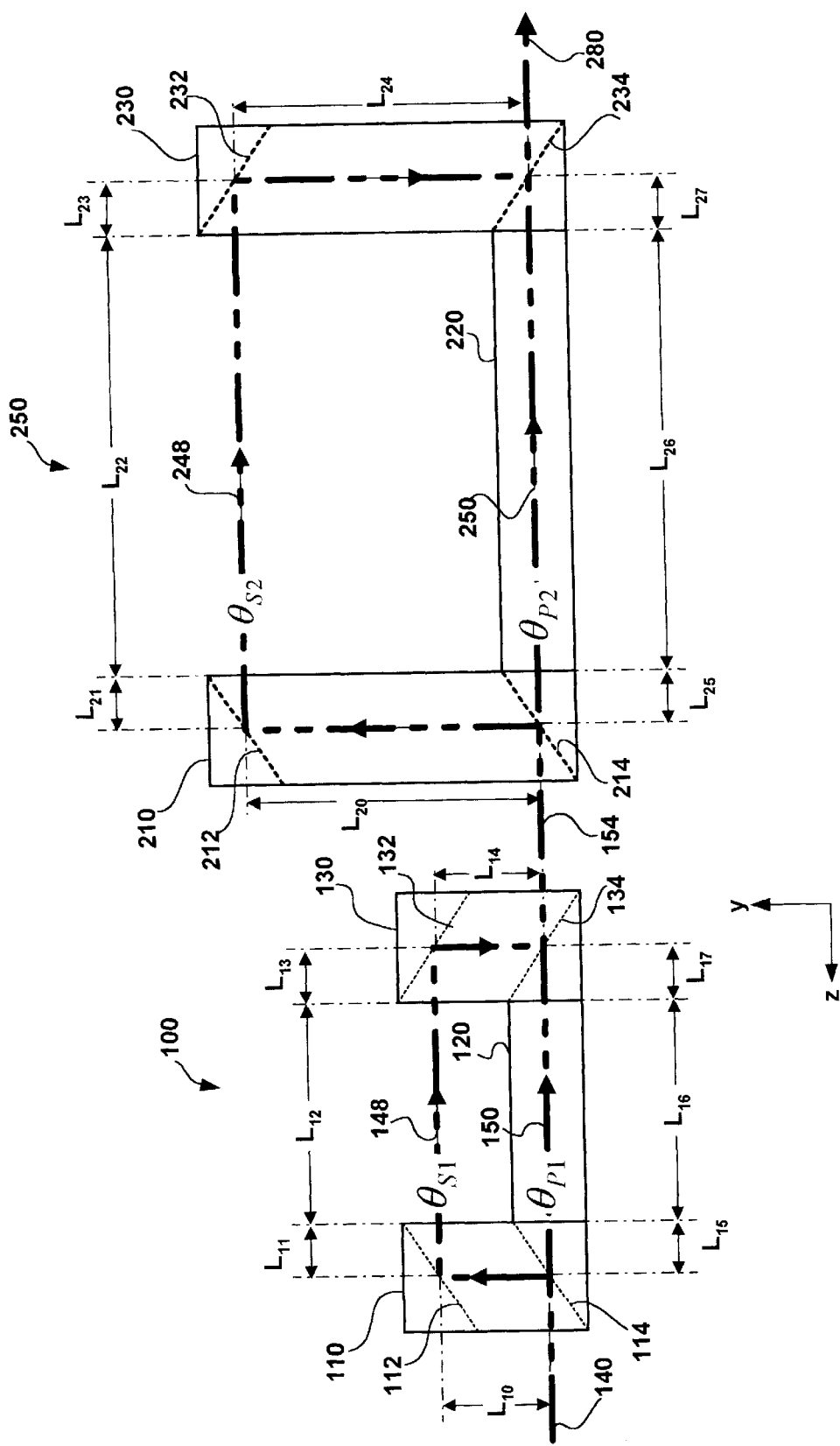
FIG. 2C is a side elevation view of the delay paths of the multi-cell implementation shown in FIGS. 2A–B.

FIG. 2C is a side elevation view of the delay paths of the multi-cell implementation shown in FIGS. 2A–B. The delay introduced into light passing along any delay path is a function of the optical path length of the optical elements which comprise the delay path. Optical path length "L" of an optical element is expressed as the product of the physical distance "d" traversed by a beam propagating through the element multiplied by the index of refraction "n" of the element. Where multiple optical elements are involved the individual contributions to the optical path length from the individual elements are summed. For purposes of the current invention optical elements include: a vacuum, a gas, a liquid, a solid or a plasma along the propagation path. The index of refraction of a medium identifies the ratio of the speed of light in a vacuum to that of light in the medium. Where the optical path length varies as here between two delay paths one path is said to be faster/slower than the other and there is said to be a delay difference between the two.

Beam 140 propagates through the first cell 100 across delay paths $\theta_{P1}$ and $\theta_{S1}$ and through the second cell 250 across delay paths $\theta_{P2}$ and $\theta_{S2}$. Delay path $\theta_{P1}$ comprises optical elements defined by optical path length $L_{15}$–$L_{17}$. Delay path $\theta_{S1}$ comprises optical elements defined by optical path lengths $L_{10}$–$L_{14}$. Delay path $\theta_{P2}$ comprises optical elements defined by optical path length $L_{25}$–$L_{27}$. Delay path $\theta_{S2}$ comprises optical elements defined by optical path lengths $L_{20}$–$L_{24}$. In the embodiment shown the optical elements defined by optical path lengths $L_{12}$ and $L_{22}$ include air/gas/vacuum. The remaining optical elements may be fabricated from various types of optical glass including: BKx, fused silica, SFx. By proper design of delay paths the fundamental and higher order harmonics for the optical filter may be established.

The delay for the delay paths $\theta_{P1}$ and $\theta_{S1}$ in the first filter 100 are expressed as a function of the optical path lengths of each path in the following Equations 1–2 respectively.

$$\theta_{S1} = \left(2\pi\frac{v}{c}\right)\left(\sum_{i=1}^{i=I} d_i n_i\right) \quad \text{Equation 1:}$$

$$\theta_{P1} = \left(2\pi\frac{v}{c}\right)\left(\sum_{j=1}^{j=J} d_j n_j\right) \quad \text{Equation 2:}$$

where c and v are the frequency and velocity of light in free space and where I and J are the number of optical elements which make up the delay paths with delays $\theta_{S1}$ and $\theta_{P1}$ respectively. For each of the I optical elements: vacuum, gas, plasma, liquid or solid which make up the delay path $\theta_{S1}$ the $i^{th}$ element has a physical length $d_i$ and an index of refraction $n_i$. For each of the J optical elements: vacuum, gas, plasma, liquid or solid which make up the delay path $\theta_{P1}$ the $j^{th}$ element has a physical length $d_j$ and an index of refraction $n_j$.

The delay difference between the two paths is expressed in Equation 3.

$$\theta_{S1} - \theta_{P1} = \left(2\pi\frac{v}{c}\right)\left(\sum_{i=1}^{i=I} d_i n_i - \sum_{j=1}^{j=J} d_j n_j\right) \quad \text{Equation 3:}$$

The delay difference for the cell is proportional to the difference in the optical path lengths between the S and P delay paths. Similar considerations apply in determining the delays and delay differences for the pair of delay paths in the second cell 200.

The optical path length difference between the two delay paths in a cell, corresponds inversely with the free spectral range (FSR) generated by the cell as evidenced in the orthogonal vector components of the output beam from the cell. This relationship is set forth in the following Equation 4.

$$FSR = \left(\frac{c}{|L_I - L_J|}\right) = \left(\frac{c}{\left|\sum_{i=1}^{i=I} d_i n_i - \sum_{j=1}^{j=J} d_j n_j\right|}\right) = 2\pi\frac{v}{(\theta_s - \theta_p)} \quad \text{Equation 4:}$$

where $L_I$ and $L_J$ are the total optical path length of the I and J elements which make up the corresponding delay paths $\theta_{S1}$ and $\theta_{P1}$.

For an optical mux/demux the FSR should be a constant perhaps equal to the channel spacing, e.g., 100 GHz. Using Equation 4 the delay difference required to generate this result can be determined, and from it a solution to the optical path lengths for each of the delay paths.

Figure 2D:
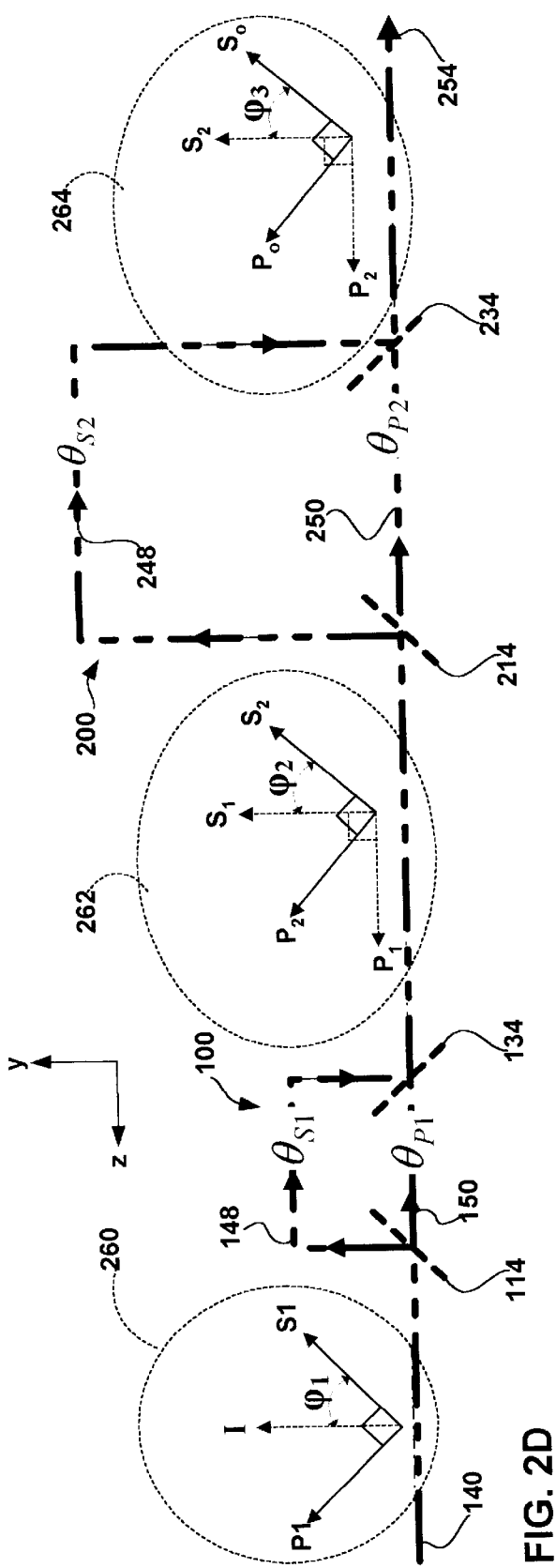
FIG. 2D is a side elevation view of the variable coupling between cells of the multi-cell implementation shown in FIGS. 2A–B.

FIG. 2D is a side elevation view of the variable coupling between cells of the multi-cell implementation shown in FIGS. 2A–B. Coupling is used to control the amount an input of polarized light that will be projected onto the S and P delay paths of a corresponding cell. Three coupling views 260, 262 and 264 are shown at appropriate locations at the input to cell 100, the interface between cells 100 and 200 and at the output of cell 200 respectively. The three views 260–264 are from the output port 204 looking back along the propagation path of the input beam 140. In the first of the coupling views 260, the polarized input is shown with a single input vector "I" and the orthogonal polarization axis P1 and S1 of the first cell 100 are shown. The input I may include orthogonal input vectors. The amount of light that is coupled onto either delay path in the first cell is determined by the angle $\phi_1$ of the incoming beam vector with the S polarization axis of the cell. In the example shown light from polarization vector 144 in amounts proportionate to sine($\phi_1$) and cos($\phi_1$) will couple to the P and S delay paths respectively. Rotation of the cell about the propagation path of the beam 140 can be used to vary the coupling percentages or ratios between the incoming light and the P and S delay paths. In the next coupling view 262, light from the output port of cell 100 is coupled with the input port of cell 200. The orthogonal polarization vectors $P_1$, $S_1$ present in the output of the first cell are shown along with the orthogonal polarization vectors $P_2$, $S_2$ which are defined by the coupler of the next cell in the sequence, i.e. cell 200. The amount of light that is coupled onto either delay path in the second cell is determined by the angle $\phi_2$ between the two sets of orthogonal vectors for the input and the cell 200. The last coupling view 264, shows both the orthogonal polarization vectors $P_2$, $S_2$ present in the output of the second cell along with a second set of orthogonal polarization vectors $P_O, S_O$. This last orthogonal vector set is used to represent output optics used to separate the orthogonal vectors within the single output beam into two discrete beams (not shown). The amount of light coupled onto the output beams is defined by the angle $\phi_3$ between the two sets of orthogonal vectors.

Figure 2E:
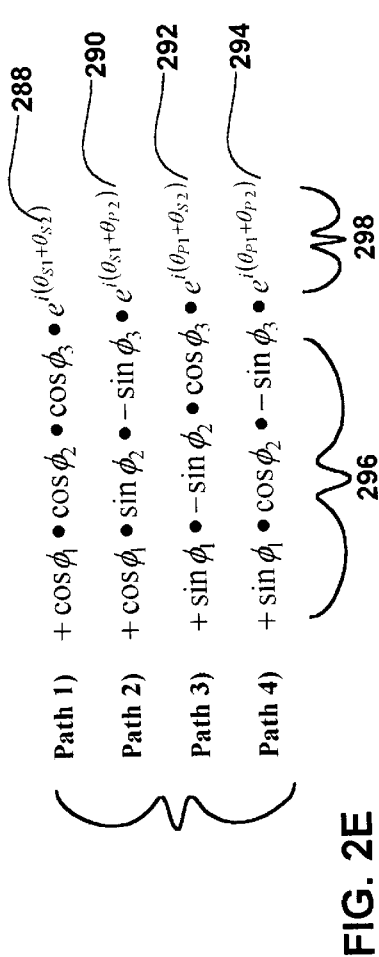
FIG. 2E shows the individual transforms associated with each of the four delay paths through the two cell sequence shown in FIG. 2A.

FIG. 2E shows the individual transforms 288 associated with each of the four distinct delay paths from the input port 102 to the output port 204. The number of discrete paths in a multi-cell sequence of N cells with two delay paths between each equals $2^N$. For two cells there are $2^2$ or 4 discrete paths between an input and an output. The first of these paths is along delay paths $\theta_{S1}$ and $\theta_{S2}$ in the first cell 100 and the second cell 200 respectively. The second of these paths is along delay paths $\theta_{S1}$ and $\theta_{P2}$. The third of these paths is along delay paths $\theta_{P1}$ and $\theta_{S2}$. The fourth of these paths is along delay paths $\theta_{P1}$ and $\theta_{P2}$. The transfer function for the optical filter in single or sequential cell embodiments is the sum of the individual transfer functions associated with each discrete path from input to output. Transfer functions: 288, 290, 292, 294 are shown for the $1^{st}$ to $4^{th}$ paths discussed above. Each transfer function includes two terms 296–298. The first term 296 corresponds to a coefficient in a Fourier series with the coefficient magnitude proportional to the product of the coupling or cross coupling coefficients along the particular path. The second term 298 corresponds to the frequency component associated with that coefficient. The frequency component corresponds with the sum of the delays along a corresponding path. This in turn corresponds with the optical path lengths along each path. The sum of all the transfer functions forms a truncated Fourier series which fully defines the optical filter.

In an embodiment of the invention a multi-cell design includes: a first cell of 100 Ghz FSR and a $2^{nd}$ cell of 50 Ghz FSR can be used to form a polarization type square top comb filters. This filter can split an optical stream with 50 Ghz channel spacing into two separate optical streams with odd and even 100 Ghz channel spacing respectively or combining two optical stream with 100 Ghz odd and even channel spacing respectively into an optical stream with 50 Ghz channel spacing. The $1^{st}$ angle $\phi_1$ can substantially equal to 45 degree and $2^{nd}$ angle $\phi_2$ can substantially equal to (45+22.5) degree. Similarly, a first cell of 100 Ghz FSR and a $2^{nd}$ cell of 50 Ghz FSR can be used to form a intensity type of square top comb filters. The $1^{st}$ splitting ratio equals substantially to 50/50% and the $2^{nd}$ splitting ratio equals $\cos^2(45+22.5°)/\sin^2(45+22.5°)$. In still another embodiment of the invention a first stage with a plurality of cells and a second stage with a plurality of cells can be coupled together to further clean up the signal. In a multi-cell embodiment a square top filter function may be achieved by choosing one cell with the base FSR and with the FSRs of the remaining cells standing in relation to the FSR of the base cell as integer fractional multiples thereof.

Further teachings on sequentially coupled optical filter cells may be found in either of the two following references. See S. E. Harris et al., *Optical Network Synthesis Using Birefringent Crystals*, JOURNAL OF THE OPTICAL SOCIETY OF AMERICA, VOLUME 54, Number 10, October 1964 for a general discussion of transfer functions related to birefringent crystals, which is hereby incorporated by reference as if fully set forth herein. See C. H. Henry et al. U.S. Pat. No. 5,596,661 entitled "Monolithic Optical Waveguide Filters based on Fourier Expansion" issued on Jan. 21, 1997 for a general discussion of transfer functions related to waveguides, which is hereby incorporated by reference as if fully set forth herein.

Passive Thermal Stabilization

The typical application of optical filters constructed using the above techniques is an optical mux/demux. In order for that device to function properly it must create the desired stop bands and pass bands for the odd and even channels which it separates. For current telecommunication applications the filter would be designed with a constant FSR perhaps equal to the channel spacing, e.g., 100 GHz. An optical filter with this FSR would generate the required stop bands and pass bands in each of the orthogonal polarization vectors present on the output. One of the orthogonal output vectors would contain the pass bands associated with the center wavelengths of the odd channels. The other of the orthogonal output vectors would contain the pass bands associated with the center wavelengths of the even channels.

Temperature variations in a mux/demux that may effect the performance may result from the environment or from the power transmitted through the device. This can result in the periodic odd and even pass bands generated by the optical filter moving out of alignment with the selected grid, e.g., the ITU grid. This is primarily because the center wavelength of a pass band slips with temperature. This misalignment results in attenuation of signal strength, cross talk and ultimately loss of transmission/reception capability until the optical filter returns to its original temperature. In practice therefore, the optical filters and devices fabricated therefrom must be thermally stable across a range of temperatures.

One solution is to flatten the pass bands of the filter. Multi cell filter designs such as those discussed above allow the pass bands to exhibit higher order harmonics in the form of non-sinusoidal pass band profiles, a.k.a. "flat tops" (See FIG. 4). The close spacing between the channels in a WDM, makes it desirable to design a WDM with flat pass bands in order to increase the error tolerance to temperature induced shifts in the pass bands. Even with flat top filter profiles temperature stabilization is still required due to the precise telecommunication channel spacing.

One solution is to actively stabilize the temperature of the multiplexer/de-multiplexer using a heater or cooler and a closed loop feedback of temperature or wavelength. This solution can be expensive and may increase the form factor of the mux/demux. Nevertheless, the current invention may be practiced with active temperature stabilization. A possible benefit to active temperature stabilization is that the optical elements which make up each pair of delay paths may all be fabricated from a common medium with identical indices of refraction and thermal expansion coefficient.

Although capable of being utilized in systems with active temperature stabilization, the current invention is capable of providing temperature stability for the optical filters without active temperature control where appropriate. This greatly enhances the precision of the devices or systems fabricated therefrom and reduces system cost. The current invention is capable of providing passive temperature stabilization of an optical device, through proper selection and design of the optical elements which form each pair of delay paths so that the delay difference for each pair of delay paths and hence the system as a whole remain constant. Since the delay difference is directly related to the difference in the optical path lengths this invention provides thermal stabilization of the delay difference. As opposed to prior art designs that use a single medium for each pair of delay paths, the current invention provides at least one of the delay paths with two optical elements each of which exhibits a different optical path length response to temperature. Typically this takes the form of optical elements with different thermal optic coefficients.

The system is designed so that $d(L_I-L_J)/dT$ equals substantially zero. This latter condition is satisfied when the derivative of the denominator in Equation 4 substantially equals zero as set forth in the following Equation 5:

$$\frac{d(L_I - L_J)}{dT} = \frac{d\left(\sum_{i=1}^{i=I} d_i n_i - \sum_{j=1}^{j=J} d_j n_j\right)}{dT} = \sum_{i=1}^{i=I}(d_i\beta_i + \alpha_i n_i d_i) - \sum_{j=1}^{j=J}(d_j\beta_j + \alpha_j n_j d_j) \approx 0 \quad \text{Equation 5:}$$

where $\alpha_i$ and $\alpha_j$ are the thermal expansion coefficients for each optical element which form the S and P delay paths respectively in each cell and where $\beta_i$ and $\beta_j$ are the thermal optic coefficients for the temperature induced change in the refractive index for each element in the S and P delay paths respectively.

The following Table 1 shows various relevant optical parameters for some optical mediums which may be used to fabricate the optical elements which make up each pair of delay paths.

TABLE 1

| 1 | @ 1550 nm | vacuum | Air | BK7 | SF5 | Fused Silica | BaK1 | LaSFN30 |
|---|---|---|---|---|---|---|---|---|
| 2 | n | 1 | 1.00027 | 1.50066 | 1.64329 | 1.44409 | 1.55517 | 1.77448 |
| 3 | $\beta = \frac{dn}{dT} \times 10^{-6}$ | 0 | 0* | 0.907465 | 1.407 | 13.7 | 0.066 | 2.293 |
| 4 | $\alpha \times 10^{-6}$ | 0 | 0* | 5.1 | 8.2 | 0.52 | 7.6 | 6.2 |

*assuming constant volume

For each material its refractive index at 1550 nm is set forth in row 2 respectively. The change in refractive index n as a function of temperature $\beta$ is set forth in rows 3. Row 7 sets forth the coefficient of thermal expansion $\alpha$ for the medium.

The selection of physical length of each optical components can be determined by solving Equation 4 and 5 together. For example, for cell 100, 1st coupler 110, $2^{nd}$ coupler 130 and spacer 150 can be made of fused silica. The $1^{st}$ beam splitting surface of prism 110 forms 35 degree angle with respect to bottom surface of the coupler. For a 100 Ghz FSR and thermally compensated cell, L16=2.862 mm and its width is FIG. 2c is 3.014 mm. The spacer length L10=1.8475 mm. $2^{nd}$ coupler 130 is identical to $1^{st}$ coupler 110.

Figure 3A:
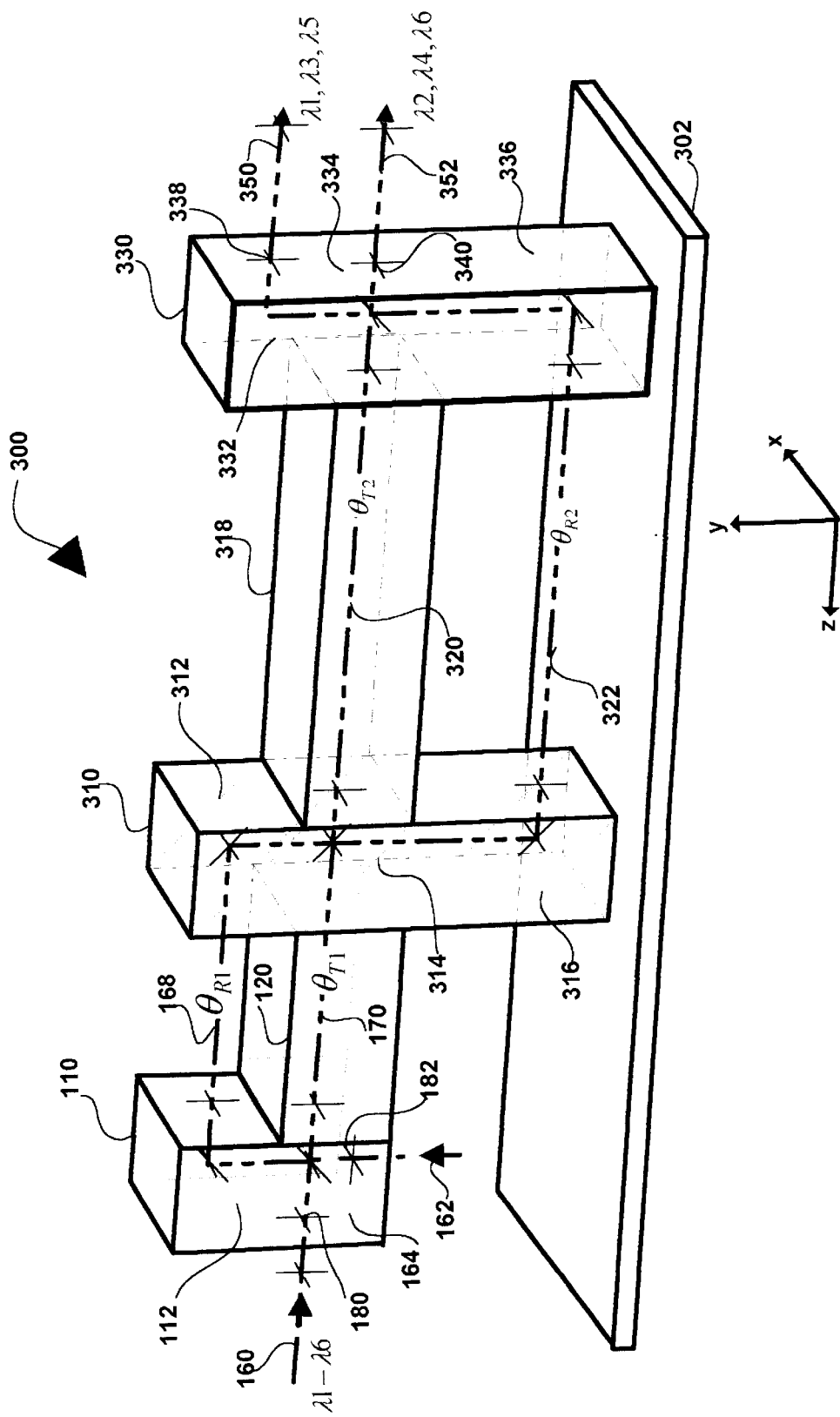
FIG. 3A is an isometric side view of an optical filter constructed from a series of delay paths coupled by intensity dependent beam splitters.

FIG. 3A is an isometric side view of an optical filter constructed from a series of delay paths coupled by intensity dependent beam splitters. Such a filter could be fabricated strictly by repetition of the cell structure shown in FIG. 1B. In this embodiment of the invention however, intermediate couplers are configured in a single coupling block with a pair of reflectors. Each intermediate coupling block couples an adjacent pair of delay paths.

Three coupler/reflector blocks 110, 310, 330 are shown with a first delay path pair $\theta_{R1}$, $\theta_{T1}$ and a second delay path pair $\theta_{R2}$, $\theta_{T2}$ between them to form a sequence of delay paths. The sequence of delay paths allows, as discussed above, an optical filter to exhibit a more complex transfer function than the simple sinusoidal output provided by the single cell shown in FIG. 1B. The second pair of delay paths $\theta_{R2}$, $\theta_{T2}$ are shown with a delay difference larger than the first pair of delay paths. For purposes of example the physical dimension of the second pair of delay paths is larger than the first pair. If the indices of refraction of the optical elements of the second set of delay paths are increased the physical dimension required to generate the larger delay difference will decrease. The first delay path pair can establish by the difference between its delay paths the fundamental sinusoidal harmonic for the sequence with the second delay path pair providing higher order harmonics. The coefficients or amplitude of each harmonic are provided by varying the coupling ratio/percentage/coefficients between the reflection and transmission delay paths within each delay path pair. The coupling coefficients are varied by varying the reflection and transmission ratios for each intensity beam splitter 164, 314 and 334 within the sequence.

The first coupler block includes intensity beam splitter 164 and reflector 112. The intensity beam splitter accepts input from either or both of beams 160–162 at the first and second ports 180–182 respectively. Optical element 120 bridges the gap between coupler/reflector block 110 and the next coupler/reflector block 310 in the sequence. Coupler/reflector block 310 includes intensity beam splitter 314 and reflectors 312, 316. The intensity beam splitter couples the inputs/outputs from the first pair of delay paths $\theta_{R1}$, $\theta_{T1}$ to the outputs/inputs of the second delay path pair $\theta_{R2}$, $\theta_{T2}$. The reflectors 312, 316 handle the redirection of the delay paths $\theta_{R1}$, $\theta_{R2}$ respectively. Optical element 320 bridges the gap between coupler/reflector block 310 and the next coupler/reflector block 330 in the sequence. Coupler/reflector block 330 includes intensity beam splitter 334 and reflectors 332, 336. The intensity beam splitter couples the inputs/outputs from the second pair of delay paths $\theta_{R2}$, $\theta_{T2}$ to the third and fourth ports 338–340. The reflector 336 handles the redirection of the delay path $\theta_{R2}$. Each coupler reflector block may be fabricated from optical glass in the same manner discussed above in connection with FIG. 1B. The various components are shown on top of base 302.

Optical beams 160–162 input at ports 180–182 respectively, traverse the sequence of delay paths to exit as two discrete optical beams 350–352 at ports 338–340 respectively. The basic structure shown here can be continued to form a longer sequence of cells and a more complex optical filter transfer function.

Figure 3B:
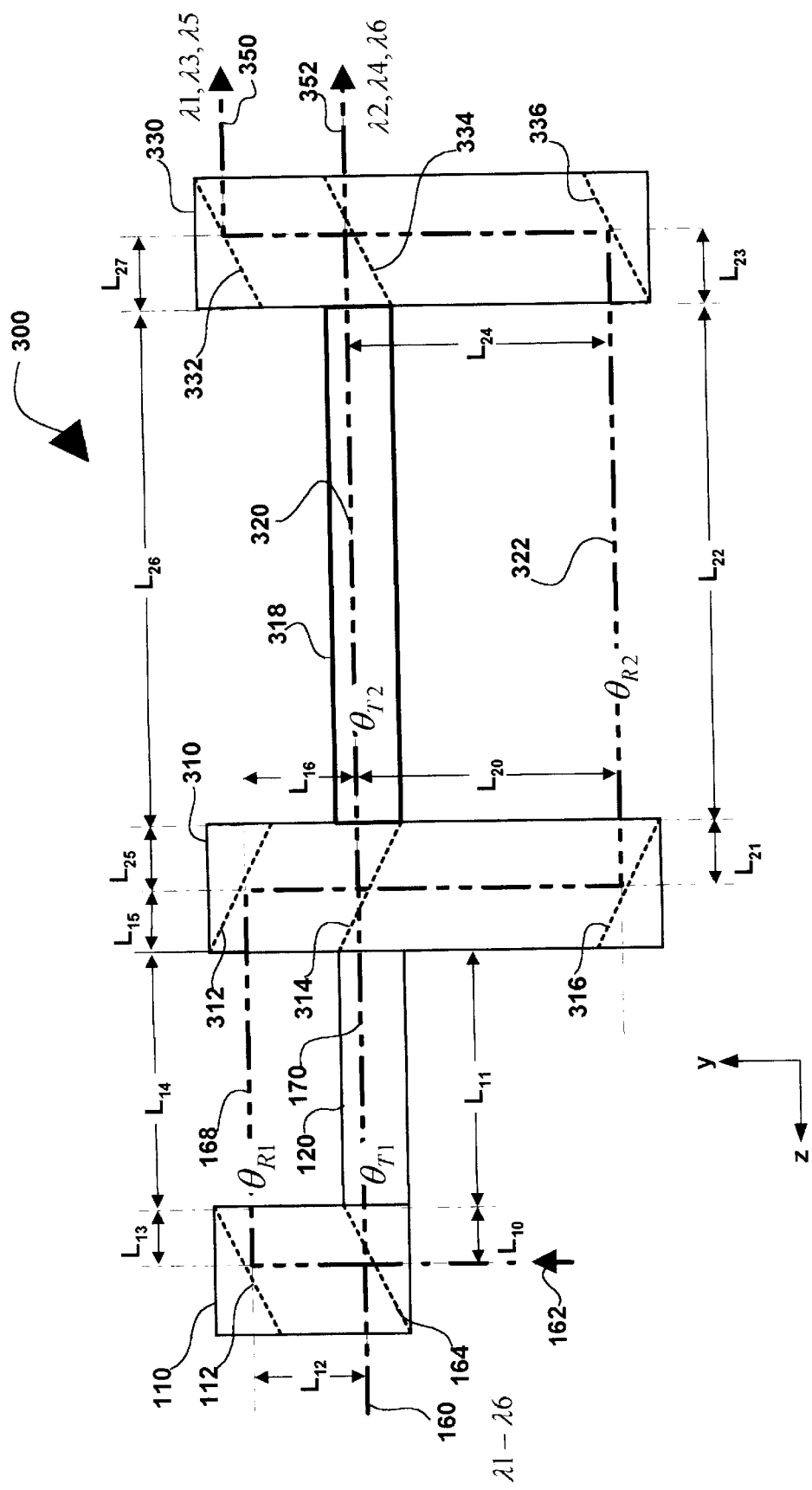
FIG. 3B is a side elevation view of the delay paths of the multi-cell implementation shown in FIG. 3A.

FIG. 3B is a side elevation view of the delay paths of the multi-cell implementation shown in FIG. 3A. The delay introduced into light passing along any delay path is a function of the optical path length of the various optical elements on the delay path. For purposes of the current invention optical elements include: a vacuum, a gas, a liquid, a solid or a plasma along the propagation path. Beams 160–162 propagate through the first pair of delay paths $\theta_{R1}$ and $\theta_{T1}$ and the second pair of delay paths $\theta_{R2}$ and $\theta_{T2}$. Delay path $\theta_{T1}$ comprises optical elements defined by optical path length $L_{10}$–$L_{11}$ and $L_{15}$. Delay path $\theta_{R1}$ comprises optical elements defined by optical path lengths $L_{12}$–$L_{16}$. Delay path $\theta_{T2}$ comprises optical elements defined by optical path lengths $L_{25}$–$L_{27}$. Delay path $\theta_{R2}$ comprises optical elements defined by optical path lengths $L_{20}$–$L_{24}$. In the embodiment shown the optical elements defined by optical path lengths $L_{14}$ and $L_{22}$ include air/gas/vacuum. The remaining optical elements may be fabricated from various types of optical glass including: BK7, fused silica, SF5. By proper design of delay paths the fundamental and higher order harmonics for the optical filter may be established.

The delay for the delay paths $\theta_{R1}$ and $\theta_{T1}$ are expressed as a function of the optical path lengths of each path as discussed above in equations Equations 1–2, with $\theta_{R1}$ substituted for $\theta_{S1}$ in Equation 1 and with $\theta_{T1}$ substituted for $\theta_{P1}$, respectively. The delay difference between the two delay paths is calculated in the same manner as shown in Equation 3 above. The delay difference for the cell is proportional to the difference in the optical path lengths between the reflection (R) and transmission (T) delay paths. Similar considerations apply in determining the delays and delay differences for the second pair of delay paths $\theta_{R2}$ and $\theta_{T2}$.

The optical path length difference between the two delay paths in a delay path pair corresponds inversely with the free spectral range (FSR) of the cell as evidenced in the pass bands and stop bands in the two output beams 350–352 from the cell. This relationship is set forth and discussed in Equation 4 above with $L_I$ and $L_J$ representing in this embodiment the total optical path length of the I and J elements which make up the corresponding delay paths $\theta_{R1}$ and $\theta_{T1}$. Now, for an optical mux/demux a condition to be satisfied is that the FSR be a constant perhaps equal to the channel spacing, e.g., 100 GHz. Using Equation 4 the delay difference required to generate this result can be determined, and from it a solution to the optical path lengths for each of the delay paths.

FIG. 3C is a side elevation view of the variable coupling between cells of the multi-cell implementation shown in FIG. 3A. Coupling is used to control the amount an input of polarized light that will be projected onto the R and T delay paths. The coupling values for the intensity beam splitters 164, 314, and 318 are $[R_1,T_1]$, $[R_2,T_2]$ and $[R_3,T_3]$ respectively.

FIG. 3D shows the individual transforms associated with each of the optical paths for input beam 160 from the input port 180 (See FIG. 3A) to the output port 350. The number of discrete paths in a multi-cell sequence of N cells with two delay paths in each delay path pair, equals $2^N$ as discussed above in connection with FIGS. 2D–E. For the embodiment shown in FIGS. 3A–C with two pairs of delay paths there are $2^2$ or 4 discrete paths between any one of the two ports serving as inputs and any one of the two output ports serving as output. Dealing with beam 160 as an input at the first port 180 (See FIG. 3A) and beam 350 as an output at port 338 (See FIG. 3A) there are 4 discrete delay paths from input to output. These paths are $\theta_{R1}>\theta_{R2}$, $\theta_{R1}>\theta_{T2}$, $\theta_{T1}>\theta_{T2}$, and $\theta_{T1}>\theta_{R2}$. The transfer function for the optical filter in single or sequential cell embodiments between any input and output port is the sum of the individual transfer functions associated with each discrete path from input to output. Transfer functions: 388, 390, 392, 394 are shown for the $1^{st}$ to $4^{th}$ paths discussed above. Each transfer function includes two terms 396–398. The first term 396 corresponds to a coefficient in a Fourier series with the coefficient magnitude proportional to the product of the coupling or cross coupling coefficients along the particular path. The second term 398 corresponds to the frequency component associated with that coefficient. The frequency component corresponds with the sum of the delays along a corresponding path. This in turn corresponds with the optical path lengths along each path. The sum of all the transfer functions forms a truncated Fourier series which fully defines the optical filter.

Thermal stabilization of the delay pairs is effected in this embodiment of the invention in the same manner as discussed above in connection with Equation 5, for all the optical elements which make up each of the delay paths.

Figure 4:
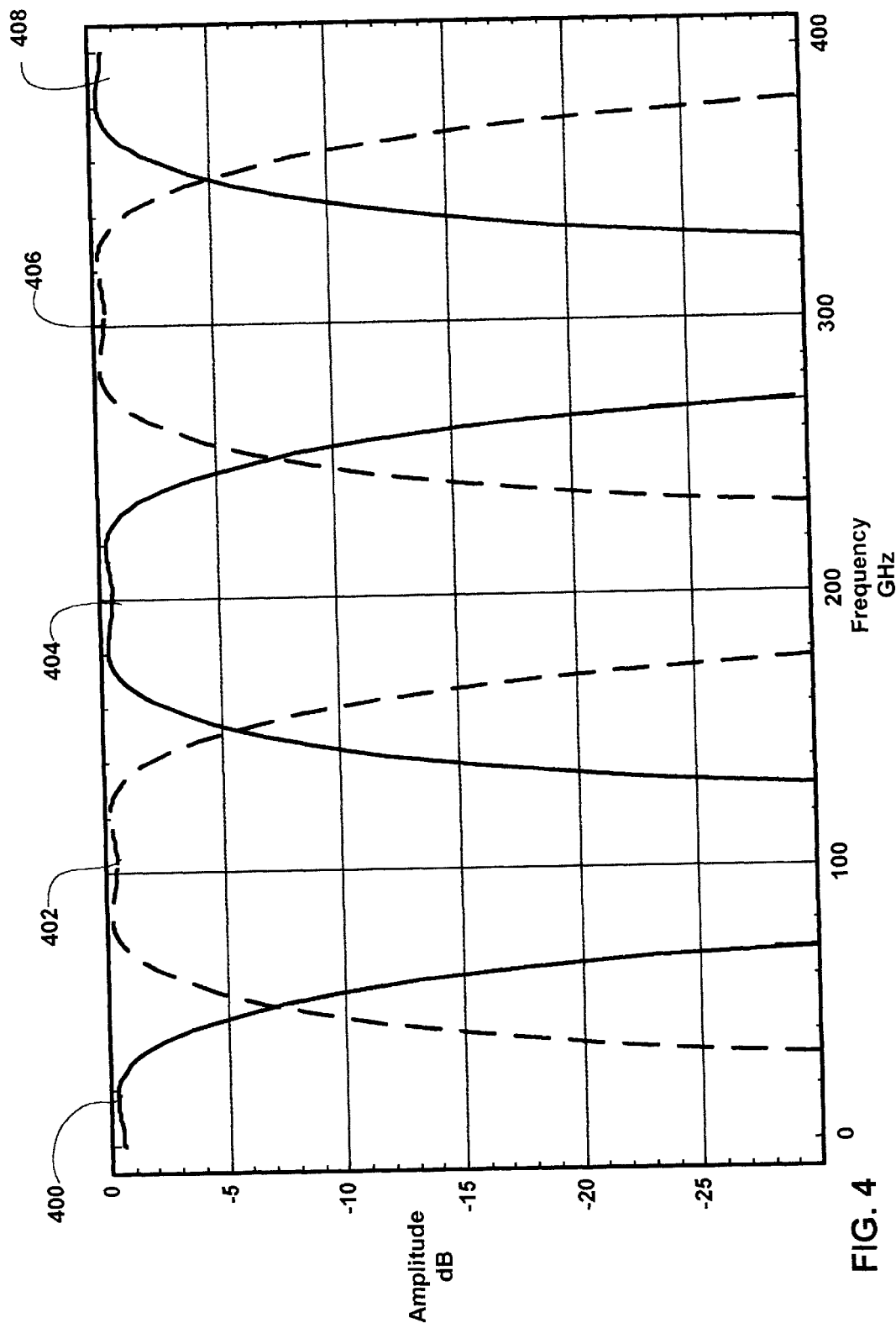
FIG. 4 is a graph showing the pass bands and stop bands associated with a specific filter transform, which may be achieved using the optical filters of the current invention.

FIG. 4 is a graph showing the pass bands and stop bands associated with a specific filter transform, which may be achieved using the optical filters of the current invention. In the example shown the envelope associated with six narrowly spaced, i.e., 100 GHz or 0.8 nm WDM channels. The odd channels 400, 404, 408 are shown in solid line. The even channels 402, 406 are shown in dashed line. The precise center frequencies of each channel are specified by standard setting organizations such as the International Telecommunications Union (ITU). These center frequencies are set forth as part of a wavelength grid which defines the center frequencies and spacing between channels. The pass bands exhibit flat tops which may be preferred because each channel is subject to shifting around the center frequency and a flat top avoids attenuation of a channel subject to such shifting. Shifting may be caused by any one of a number of factors including temperature, inter-channel interference and polarization mode dispersion. The flat top profile is achieved by the sequencing of optical filters as shown in either of FIG. 2A or 3A, to provide higher order harmonics.

In alternate embodiments of the invention the cells and serially coupled cells may be fabricated on a common semi-conductor substrate. The various components: reflectors, couplers, and optical elements may be fabricated using a combination of etching and deposition techniques well know in the semi-conductor industry.

The foregoing description of preferred embodiments of the invention has been presented for purposes of illustration and description. It is not intended to be exhaustive or to limit the invention to the precise forms disclosed. Obviously many modifications and variations will be apparent to practitioners skilled in this art.

What is claimed is:

1. An optical filter comprising:
   at least one cell with a first port and a second port coupled to one another by separate first and second optical paths with first and second delays respectively, the first and second optical paths accepting polarized first and second components respectively of a polarized input light beam at one of the first and the second ports and providing at the other of the first and second ports a polarized output light beam with a phase shift between the polarized first and second components, the phase shift corresponding to a difference between the first and second delays, wherein the polarized output light beam includes at least one pass band having a center wavelength; and
   means for shifting the center wavelength of the at least one pass band to a particular center wavelength.

2. The optical filter of claim 1, wherein a relative magnitude of the first and second components on the first and second optical paths, respectively, are determined in accordance with an angle of rotation of the at least one cell with respect to a propagation axis of the polarized input light beam.

3. The optical filter of claim 1, wherein the first and second optical paths include corresponding first and second optical path lengths, respectively, with a difference in the optical path lengths corresponding inversely with a free spectral range (FSR) of the at least one cell.

4. The optical filter of claim 1, wherein the at least one cell further comprises:
   at least two optical elements defining a first optical path length of the first optical path; and
   at least one optical element defining a second optical path length of the second optical path, with the at least one optical element and the at least two optical elements fabricated from a particular medium to passively thermally stabilize the optical path length difference between the first and second optical paths.

5. The optical filter of claim 1, wherein the at least one cell further comprises:
   a first plurality of optical elements defining a first optical path length of the first optical path and a second plurality of optical elements defining a second optical path length of the second optical path, wherein the first and second plurality of optical elements are selected such that a difference in optical path length between the first optical path and the second optical path remains approximately equal as temperature changes.

6. The optical filter of claim 5, wherein:
   the first plurality of optical elements includes a number "I" of optical elements defining the first optical path length of the first optical path, each of the I optical elements exhibiting a distinct index of refraction $n_i$ and length $d_i$ along the first optical path;
   the second plurality of optical elements includes a number "J" of optical elements defining the second optical path length of the second optical path, each of the J optical elements exhibiting a distinct index of refraction $n_j$ and length $d_j$ along the second optical path; and
   wherein the I and J optical elements exhibit a relationship with respect to temperature (T):

$$\frac{d\left(\sum_{i=1}^{i=I} d_i n_i - \sum_{j=1}^{j=J} d_j n_j\right)}{dT} \approx 0.$$

7. The optical filter of claim 6, wherein the first and second plurality of optical elements comprise at least one of: a vacuum, a gas, a plasma, a liquid and a solid.

8. The optical filter of claim 1, wherein the at least one cell comprises:
   a first and a second polarization beam splitter coupled to the first port and the second port, respectively, the first and second polarization beam splitters transmitting the first of the polarized components of polarized light along the first optical path and reflecting the second of the polarized components of polarized light along the second optical path; and
   at least one reflector positioned along at least one of the first optical path and the second optical path to reflect a corresponding one of the first and second components between said first and second polarization beam splitters.

9. The optical filter of claim 1, wherein the at least one cell comprises:
   a first and a second birefringent crystal each having an optical axis coplanar with and at substantially complementary angles to one another, the first and second birefringent crystals coupled to the first and second ports, respectively, to split the polarized light input into orthogonally polarized first and second "e" and "o" ray components and to recombine the "e" and "o" ray components as the polarized output light beam.

10. The optical filter of claim 1, wherein the optical filter further comprises:
    a plurality of cells each with first and second ports, the plurality of cells coupled serially to one another to provide a plurality of delays along a plurality of optical paths between the first and second ports of each of the plurality of cells, wherein a first one of the plurality of cells receives the polarized input light beam and provides the polarized output light beam, and wherein the polarized output light beam from the first cell represents the polarized input light beam for an adjacent one of the plurality of cells, wherein a phase shift within each of the plurality of cells corresponds to a difference in delay among at least two of the plurality of delays along the plurality of optical paths, and wherein a relative magnitude of the first and second components on the plurality of first and second optical paths for each of said plurality of cells, respectively, is determined in accordance with an angle of rotation of each of said plurality of cells with respect to the adjacent one of said plurality of cells from which the polarized light input is provided.

11. The optical filter of claim 1, with the at least one cell comprising:
    a plurality of cells each with first and second ports and with the plurality of cells coupled to one another to provide a plurality of delays along a plurality of first and second optical paths between the first and second ports, wherein the polarized output light beam is output from the plurality of cells and corresponds to a sum of a Fourier series in which each term corresponds in amplitude and phase with each of the first and second optical paths traversed by the polarized first and second components.

12. The optical filter of claim 1, wherein the at least one cell further comprises:
    a first cell at an angle of rotation with respect to a propagation axis of a polarized input light beam of at least one of 45 degrees and 22.5 degrees; and
    a second cell at an angle of rotation with respect to a propagation axis of polarized input light beam of the other of 45 degrees and 22.5 degrees.

13. The optical filter of claim 1, wherein the at least one cell further comprises at least one of: a multiplexer, a demultiplexer, an optical router and a gain equalizer.

14. The optical filter of claim 1, wherein the angle of the at least one cell with respect to an optical path of the polarized input light beam is selectable to provide tuning of the polarized output beam with respect to a selected wavelength grid.

15. The optical filter of claim 1, further comprising;
    a linear polarizer coupled to the first port for linearly polarizing an optical input; and
    a beam displacer/combiner, optically coupled with the second port to displace and combine the polarized first and second components depending on a propagation direction thereof.

16. A method for optically filtering light, the method comprising:
    coupling light between a first port and a second port in parallel along separate first and second optical paths with first and second delays respectively;
    accepting orthogonally polarized first and second components of polarized light input at one of the first and second ports along the first and second optical paths respectively;

providing at an other of the first and second ports a polarized output beam with a phase shift between the orthogonally polarized first and second components and with the phase shift corresponding in a magnitude with a difference between the first and second delays, wherein the polarized output beam has at least one passband with a center wavelength; and adjusting the center wavelength of the at least one passband of the polarized output beam to a particular center wavelength.

17. The method of claim 16, further comprising:

rotating the first and second optical paths about a propagation axis of a polarized light input to varying a relative magnitude of the first and second components on the first and second optical paths respectively.

18. The method of claim 16, further comprising:

varying an optical path length difference between the first and second optical paths to vary the phase shift between the orthogonally polarized first and second components.

19. The method of claim 16, further comprising:

effecting offsetting temperature related variations in the optical path lengths of the first and second optical paths to render the phase shift between the orthogonally polarized first and second components substantially invariant with respect to temperature.

20. The method of claim 16, wherein the accepting act further comprises:

splitting the orthogonally polarized light into a first portion transmitted along the first optical path and a second portion transmitted along the second optical path; and wherein the providing act further comprises:

combining the first portion and the second portion into the polarized output beam.

21. The method of claim 16, comprising:

repeating the coupling, accepting and providing acts to provide a plurality of first and second port pairs coupled to one another, thereby providing a plurality of delays along a plurality of optical paths, respectively, between the plurality of first and second port pairs, wherein a phase shift between each first and second port pair corresponds to a difference between the plurality of delays along a corresponding plurality of optical paths, wherein a relative magnitude of the first and second components on the plurality of optical paths between each of the plurality of first and second port pairs, respectively, is determined in accordance with an angle of rotation of each successive first and second port pair with respect to an adjacent pair.

22. The method of claim 16, comprising:

repeating the coupling, accepting and providing acts to provide a plurality of first and second port pairs coupled serially to one another to provide a plurality of distinct delays along a plurality of combinations of optical paths between an input and an output one of the first and second ports and with the polarized output beam corresponding to a sum of a Fourier series in which each term of the Fourier series corresponds in amplitude and phase with each of the plurality of combinations of optical paths between the input and the output.

23. An optical device for optically filtering polarized light comprising:

means for coupling light between a first port and a second port along separate first and second optical paths with first and second delays respectively;

means for accepting orthogonally polarized first and second components of polarized light input at the first port along the first and second optical paths respectively; and means for providing at a polarized output beam at the second port with a phase shift that corresponds to a difference between the first and second delays between the orthogonally polarized first and second components, the means for providing a polarized output further comprising means for shifting a center wavelength such that polarized output beam has at least one pass band with a particular center wavelength.

24. The means for optically filtering of claim 23, comprising:

means for rotating the first and second optical paths about a propagation axis of a polarized light input, thereby varying a relative magnitude of the first and second components on the first and second optical paths respectively.

25. The means for optically filtering of claim 23, comprising:

means for varying an optical path length difference between the first and second optical paths to vary the phase shift between the orthogonally polarized first and second components.

26. The means for optically filtering of claim 23, comprising:

means for effecting offsetting temperature related variations in the optical path lengths of the first and second optical paths to render the phase shift between the orthogonally polarized first and second components substantially invariant with respect to temperature.

27. The means for optically filtering of claim 23, wherein the means for accepting further comprises:

means for splitting the orthogonally polarized light into a transmitted portion along the first optical path and a reflected portion along the second optical path; and wherein the means for providing further comprises:

means for combining the transmitted portion and the reflected portion into the polarized output beam.

28. The means for optically filtering of claim 23, further comprising:

a plurality of means for coupling, a plurality of means for accepting and a plurality of means for providing being arranged to define a plurality of first and second port pairs coupled to one another, thereby providing a plurality of delays along a corresponding plurality of optical paths, respectively, between the plurality of first and second port pairs, wherein a phase shift between each first and second port pair corresponds to a difference in delays along a corresponding plurality optical paths, wherein a relative magnitude of the first and second components on the plurality optical paths between each of the plurality of first and second port pairs, respectively, is determined in accordance with an angle of rotation of each successive first and second port pair with respect to an adjacent pair.

29. The means for optically filtering of claim 23, further comprising:

a plurality of means for coupling, a plurality of means for accepting and a plurality of means for providing being arranged to define a plurality of first and second port pairs coupled serially to one another to provide a plurality of distinct delays along a plurality of combinations of optical paths between an input and an output one of the first and second port pairs, wherein the polarized output beam corresponds to a sum of a Fourier series in which each term of the Fourier series corresponds in amplitude and phase with each of the plurality of combinations of optical paths between the input and the output.

30. An optical filter that outputs at least one output beam having one or more pass bands with center wavelengths, the optical filter comprising:

a first coupler with first and second ports for coupling light from the first and second ports with first and second optical paths;

a plurality of optical elements with at least two optical elements of the plurality of optical elements defining a first optical path length of the first optical path, wherein the first and second optical paths exhibit first and second delays, respectively, wherein the plurality of optical elements passively thermally stabilize an optical path length difference between the first and second optical paths, and wherein the at least two optical elements are adjusted in a direction normal to the first optical path such that the one or more pass bands of the at least one output beam each have a particular center wavelength; and a second coupler with third and fourth ports for coupling light from the first and second optical paths with the third and fourth ports.

31. The optical filter of claim 30, wherein the first coupler further comprises:

a partial reflector coupled to the first and second ports and the first and second optical paths, wherein the partial reflector includes an amount of reflectance determinative of relative amounts of optical energy coupled between each of the first and second ports and the first and second optical paths.

32. The optical filter of claim 30, wherein the second coupler further comprises:

a partial reflector coupled to the third and fourth ports and the first and second optical paths, wherein the partial reflector includes an amount of reflectance determinative of relative amounts of optical energy coupled between each of the third and fourth ports and the first and second optical paths.

33. The optical filter of claim 30, wherein the first and second optical path lengths differ from one another by an amount inversely proportional with a selected free spectral range (FSR).

34. The optical filter of claim 30, wherein the plurality of optical elements further comprises a first plurality of optical elements defining the first optical path length of the first optical path and a second plurality of optical elements defining a second optical path length of the second optical path, wherein the first and second plurality of optical elements are selected such that a difference in optical path length between the first optical path and the second optical path remains approximately equal as temperature changes.

35. The optical filter of claim 34, wherein:

the first plurality of optical elements includes a number "I" of optical elements defining the first optical path length of the first optical path, each of the I optical elements exhibiting a distinct index of refraction $n_i$ and length $d_i$ along the first optical path;

the second plurality of optical elements includes a number "J" of optical elements defining the second optical path length of the second optical path, each of the J optical elements exhibiting a distinct index of refraction $n_j$ and length $d_j$ along the second optical path; and wherein the I and J optical elements exhibit a relationship with respect to temperature (T):

$$\frac{d\left(\sum_{i=1}^{i=I} d_i n_i - \sum_{j=1}^{j=J} d_j n_j\right)}{dT} \approx 0.$$

36. The optical filter of claim 30, wherein the plurality of optical elements comprises at least one of: a vacuum, a gas, a plasma, a liquid and a solid.

37. The optical filter of claim 30, wherein the wherein the angle of at least one of the first and second couplers with respect to an optical path of an input light beam is selectable to provide tuning of the output beam with respect to a selected wavelength grid.

38. An optical filter comprising:

bi-directional couplers with bi-directional first and second pairs of ports, each bi-directional coupler providing configurable amounts of coupling and cross-coupling for optical energy between the first and second pairs of ports; and sets of optical elements with each set forming passively thermally compensated pairs of first and second delay paths with a delay difference between the pair of first and second delay paths being substantially invariant with respect to temperature, wherein the first and second delay paths formed by each set of optical elements are coupled so as to form a sequence of delay paths such that optical energy propagates through a plurality of distinct delay paths from an input at a first of the bi-directional couplers in the sequence to an output at a last of the bi-directional couplers in the sequences, wherein at least one set of optical elements is adjusted such that one or more output beams have center wavelengths at multiples of a periodic interval related to a difference between a first delay of the first delay path and a second delay of the second delay path.

39. The optical filter of claim 38, wherein each set of optical elements further comprises:

a quantity "I" of optical elements defining a first optical path length of the first delay path, wherein each of the I optical elements exhibit an index of refraction $n_i$ and length $d_i$ along the first delay path;

a quality "J" of optical elements defining a second optical path length of the second delay path, wherein each of the J optical elements exhibit an index of refraction $n_j$ and length $d_j$ along the second delay path; and wherein the I and J optical elements exhibit the following relationship with respect to temperature (T):

$$\frac{d\left(\sum_{i=1}^{i=I} d_i n_i - \sum_{j=1}^{j=J} d_j n_j\right)}{dT} \approx 0.$$

40. The optical filter of claim 38, with the sets of optical elements further comprise at least one of a vacuum, a gas, a plasma, a liquid and a solid.

41. The optical filter of claim 38, wherein the angle of at least one of the first and second bi-directional couplers with respect to an optical path of an input light beam is selectable to provide tuning of the output beam with respect to a selected wavelength grid.

42. The optical filter of claim 38, wherein each bi-directional coupler further comprises:

a partial reflector coupled to the first and second pairs of ports, wherein the partial reflector has an amount of reflectance determinative of relative amounts of optical energy coupled between each port of said first and second pair of ports.

43. The optical filter of claim 38, wherein each of the bi-directional couplers provides selected coupling coefficients between the first and second pair of ports and each of the sets of optical elements are configured to provide selected delay paths such that optical energy propagates through a plurality of distinct delay paths from an input at a first of the bi-directional couplers in the sequence to an output at a last of the bi-directional couplers in the sequence and with each of the plurality of distinct delay paths corresponding to a term in a Fourier series for which the output is the sum of the Fourier series.

44. An optical filter that receives one or more input beams and that outputs one or more output beams that have pass bands with a center wavelength, the optical lifter comprising:

an input port that receives at least one input beam;

an output port that outputs least one output beam, wherein the at least one output beam has one or more pass bands that each have a center wavelength;

a first delay path that has a first delay, the first delay path comprising:
  a first wedge; and
  a second wedge that is moved relative to the first wedge until the one or more pass bands each exhibit a particular center wavelength, wherein the first wedge is fixed relative to the second wedge when the one or more pass bands each exhibit the particular center wavelength; and a second delay path.

45. An optical filter as defined in claim 44, wherein the input port further comprises at least one polarization dependent beam splitters and wherein the output port further comprises at least one polarization beam splitters.

46. An optical filter as defined in claim 44, wherein the first wedge and the second wedge are tilted in a direction normal to the first delay path to adjust each center wavelength of each pass band.

47. An optical filter as defined in claim 44, wherein the input port further comprises at least one intensity splitter and the output port further comprises at least one intensity splitter.

48. An optical filter as defined in claim 44, wherein the second delay path includes one or more optical elements and the first delay path comprises one or more optical elements.

49. An optical filter as defined in claim 48, wherein the one or more optical elements in the first delay path and the one or more optical elements in the second delay path are fabricated from a common medium with similar identical indices of refraction and similar thermal expansion coefficients to offset temperature related variations in the first delay path and the second delay path.

* * * * *